(12) United States Patent
John Archibald et al.

(10) Patent No.: US 9,836,591 B2
(45) Date of Patent: Dec. 5, 2017

(54) MANAGING LATENCY AND POWER IN A HETEROGENEOUS DISTRIBUTED BIOMETRIC AUTHENTICATION HARDWARE

(71) Applicant: QUALCOMM Incorporated, San Diego, CA (US)

(72) Inventors: Fitzgerald John Archibald, Toronto (CA); John Keith Schneider, Williamsville, NY (US); David Tamagno, Livermore, CA (US); Laurence Geoffrey Lundblade, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 4 days.

(21) Appl. No.: 14/572,229

(22) Filed: Dec. 16, 2014

(65) Prior Publication Data

US 2016/0171198 A1 Jun. 16, 2016

(51) Int. Cl.
G06F 21/00 (2013.01)
G06F 21/32 (2013.01)
G06F 21/57 (2013.01)

(52) U.S. Cl.
CPC ............ *G06F 21/32* (2013.01); *G06F 21/577* (2013.01); *G06F 2221/034* (2013.01)

(58) Field of Classification Search
CPC ....................................................... G06F 21/32
See application file for complete search history.

(56) References Cited

U.S. PATENT DOCUMENTS

| | | | |
|---|---|---|---|
| 6,792,287 B1 | 9/2004 | Tuomela et al. | |
| 7,809,863 B2 | 10/2010 | Beutler et al. | |
| 8,300,904 B2 | 10/2012 | Chen et al. | |
| 8,370,639 B2* | 2/2013 | Azar | G06F 21/32 713/186 |
| 8,406,478 B2 | 3/2013 | Chen et al. | |
| 9,195,879 B1 | 11/2015 | Du et al. | |
| 2002/0112177 A1* | 8/2002 | Voltmer | G06F 21/32 726/26 |
| 2007/0248249 A1* | 10/2007 | Stoianov | G06K 9/00087 382/124 |
| 2009/0271635 A1* | 10/2009 | Liu | G06F 21/32 713/186 |
| 2010/0162386 A1* | 6/2010 | Li | G06F 21/32 726/19 |

(Continued)

OTHER PUBLICATIONS

Partial International Search Report—PCT/US2015/058453—ISA/EPO—dated Feb. 15, 2016, 7 pgs.

(Continued)

*Primary Examiner* — Morshed Mehedi
(74) *Attorney, Agent, or Firm* — Hunter Clark PLLC

(57) ABSTRACT

Techniques for authenticating a biometric input are disclosed. An example of a biometric authentication system is configured to receive a biometric input, perform a first authentication process on the biometric input with an application processor, such that the first authentication process generates one or more authentication parameters, provide the one or more authentication parameters to a secure processor, perform a second authentication process on the biometric input on the secure processor, such that the second authentication process utilizes the one or more authentication parameters, and output an authentication score based on the second authentication process.

16 Claims, 12 Drawing Sheets

(56) References Cited

U.S. PATENT DOCUMENTS

| | | | | |
|---|---|---|---|---|
| 2011/0314285 | A1* | 12/2011 | Hirata | H04L 63/0861 |
| | | | | 713/170 |
| 2012/0016798 | A1* | 1/2012 | Carper | G06Q 20/1085 |
| | | | | 705/43 |
| 2013/0174243 | A1* | 7/2013 | Inatomi | H04L 9/3231 |
| | | | | 726/7 |
| 2014/0056493 | A1* | 2/2014 | Gozzini | G06K 9/00087 |
| | | | | 382/124 |
| 2014/0181959 | A1* | 6/2014 | Li | G06F 21/32 |
| | | | | 726/19 |
| 2014/0368626 | A1 | 12/2014 | Fitzgerald | |
| 2014/0368688 | A1 | 12/2014 | Fitzgerald | |
| 2015/0046676 | A1 | 2/2015 | Archibald et al. | |
| 2016/0048840 | A1* | 2/2016 | Lee | G06Q 20/40145 |
| | | | | 382/124 |
| 2016/0063294 | A1 | 3/2016 | Du et al. | |
| 2016/0063300 | A1 | 3/2016 | Du et al. | |

OTHER PUBLICATIONS

International Search Report and Written Opinion—PCT/US2015/058543—ISA/EPO—dated Apr. 26, 2016—15 pgs.
Second Written Opinion from International Application No. PCT/US2015/058543, dated Nov. 15, 2016, 6 pgs.
International Preliminary Report on Patentability—PCT/US2015/058543—European Patent Office—Rijswijk, The Netherlands—dated Mar. 27, 2017—7 pgs.

* cited by examiner

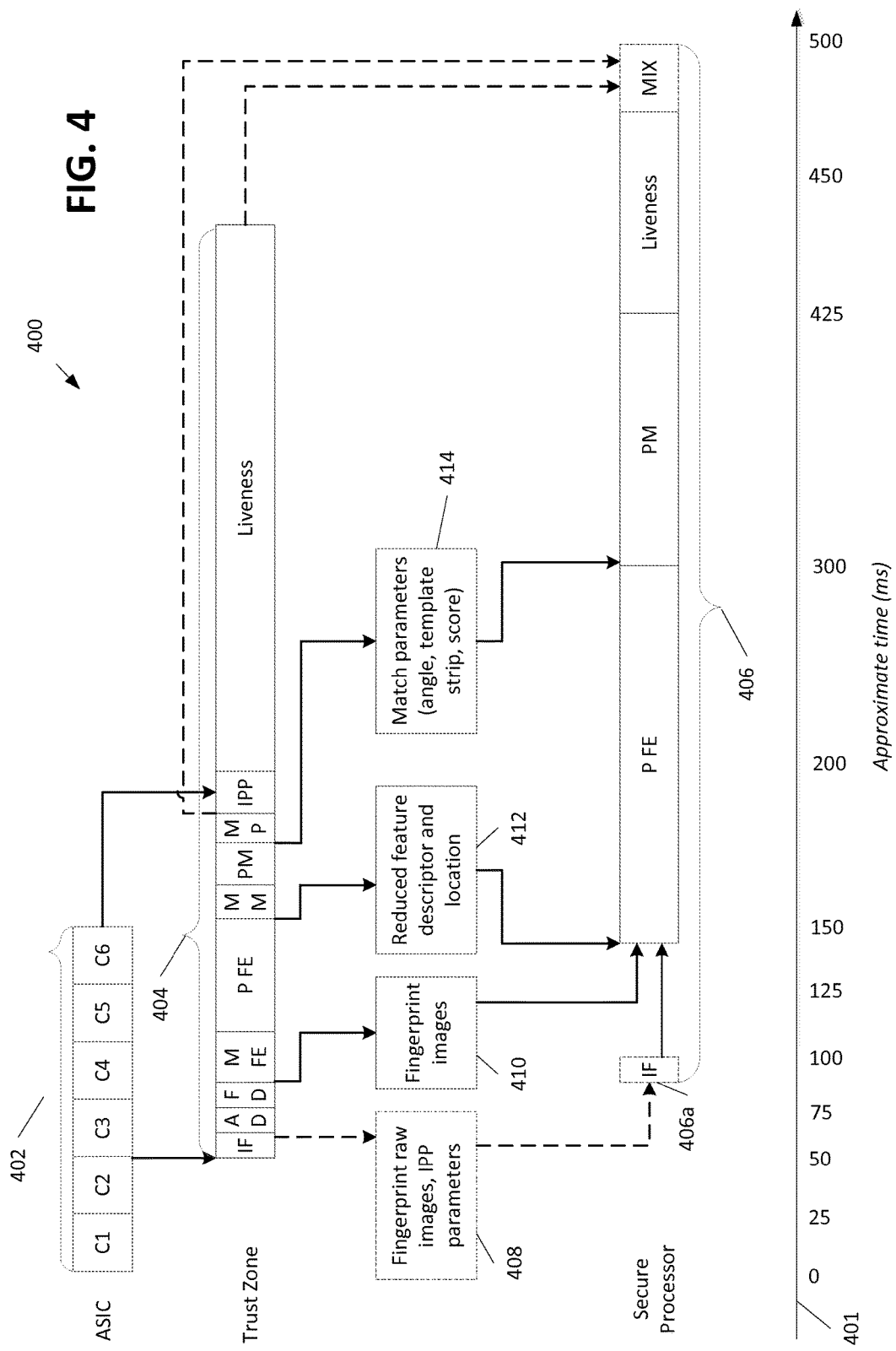

MANAGING LATENCY AND POWER IN A HETEROGENEOUS DISTRIBUTED BIOMETRIC AUTHENTICATION HARDWARE

BACKGROUND

An aspect of this invention generally relates to data processing devices and more particularly to performing biometric authentication within a data processing device.

Data processing devices such as smart phones and personal computing systems often rely on battery power to enable mobile operation. The computing capabilities of the processors in battery operated devices may be managed in an effort to extend battery life and maintain appropriate performance levels. Many battery operated devices include biometric readers to increase security for access to the device. In general, biometric security systems allow a user to gain access if biometric information submitted by the user is authenticated by the device. A typical authentication process relies on matching the biometric information submitted by the user with a previously established and stored template, which is a data representation of a source biometric sample. Authentication algorithms may include complex computations that require higher levels of processor capabilities to minimize latency issues. Providing a responsive biometric security system on a mobile data processing device may be dependent on effective management of processor performance.

The security features of biometric authentication systems may also depend on the integrity of the software and hardware components within a data processing device. A corrupted operating system, or authentication algorithm, may allow malicious code (e.g., malware) to execute on a data processing device. Such malicious code may circumvent the authentication process and provide unauthorized access to a user's personal or confidential information. The introduction of malicious code into the data processing device may also create complications in the biometric measurement and template storing processes. Further, false or spoofed biometric inputs may be used to attack a trusted biometric system. A falsified biometric trait, such as a fake finger comprised of wax, clay, gummy bears, etc., may be presented to a biometric scanner in an effort to by-pass security restrictions. Authentication algorithms may include anti-spoofing techniques to help distinguish between live and spoofed biometric traits.

SUMMARY

An example method for authenticating a biometric input according to the disclosure includes receiving the biometric input, performing a first authentication process on the biometric input with at least one application processor, such that the first authentication process generates one or more authentication parameters, providing the one or more authentication parameters to a secure processor, performing a second authentication process on the biometric input on the secure processor, such that the second authentication process utilizes the one or more authentication parameters, and outputting an authentication score based on the second authentication process.

Implementations of such a method may include one or more of the following features. The processing capability of the at least one application processor may be greater than the processing capability of the secure processor. The first authentication process may include a keypoint detection stage, a feature detection stage, and a feature matching stage, such that one or more previously stored feature templates are utilized in the feature matching stage. The one or more authentication parameters may include a pruned list of active areas. The one or more authentication parameters may include template association information. The first authentication process may include calculating a match score and the one or more authentication parameters may include a matched pair and a match angle. The first authentication process may include calculating a liveness score. The biometric input maybe a fingerprint.

An example method for managing latency and power in a heterogeneous distributed biometric authentication system according to the disclosure includes receiving biometric image information on a first processor and a second processor, such that the processing capability of the first processor is greater than the processing capability of the second processor, configuring the first processor to operate in a high speed mode, determining a feature extraction result and a feature matching result with the first processor operating in high speed mode, such that the feature matching result is based on a comparison of the received biometric image information and a previously stored biometric template, providing the feature extraction result and the feature matching result to the second processor, configuring the first processor to operate in a default mode, such that the processing capability of the first processor while in the default mode is less than it is while in the high speed mode, and determining an authentication score with the second processor, such that the authentication score is based at least in part on the feature matching result determined on the first processor.

Implementations of such a method may include one or more of the following features. A biometric object within the biometric image information may be detected when the first processor is in the default mode, and the first processor may be configured to operate in the high speed mode after the biometric object is detected. A temporal change in the biometric image information may be detected when the first processor is in the default mode, and the first processor may be configured to operate in the high speed mode after the temporal change in the biometric image information is detected. A liveness score may be determined with the first processor when the first processor is in the high speed mode, and the liveness score may be provided to the second processor. Determining the authentication score with the second processor may be based at least in part on the liveness score determined on the first processor. The second processor may be activated on or about the time the feature extraction result and the feature matching result are provided to the second processor, and deactivated on or about the time after the authentication score is determined. The power consumption of the first processor while in the default mode may be less than it is while in the high speed mode. The biometric object may be a fingerprint.

An example system for authenticating a biometric input according to the disclosure includes at least one application processor configured to perform a first authentication process on the biometric input, such that the first authentication process generates one or more authentication parameters, a secure processor configured to receive the one or more authentication parameters, perform a second authentication process on the biometric input, such that the second authentication process utilizes the one or more authentication parameters, and output an authentication score based on the second authentication process.

Implementations of such a system may include one or more of the following features. The processing capability of the at least one application processor may be greater than a processing capability of the secure processor. The at least one application processor maybe configured to perform a keypoint detection stage, a feature detection stage, and a feature matching stage, such that one or more previously stored feature templates are utilized in the feature matching stage. The one or more authentication parameters may include a pruned list of active areas and/or template association information. The at least one application processor may be configured to calculate a match score and the one or more authentication parameters include a matched pair and a match angle. The biometric input may be a fingerprint, and the at least one application processor maybe configured to calculate a liveness score.

An example of a computer program product according to the disclosure includes a non-transitory computer-readable storage medium with code for receiving a biometric image information on a first processor and a second processor, such that the processing capability of the first processor is greater than the processing capability of the second processor, code for configuring the first processor to operate in a high speed mode, code for determining a feature extraction result and a feature matching result with the first processor in high speed mode, such that the feature matching result is based on a comparison of the received biometric image information and a previously stored biometric template, code for providing the feature extraction result and the feature matching result to the second processor, code for configuring the first processor to operate in a default mode, such that the processing capability of the first processor while in the default mode is less than it is while in the high speed mode, and code for determining an authentication score with the second processor, such that the authentication score is based at least in part on the feature matching result determined on the first processor.

Implementations of such a computer program product may include one or more of the following features. The computer program may include code for detecting a biometric object within the biometric image information with the first processor when the first processor is in the default mode, and code for configuring the first processor to operate in the high speed mode after the biometric object is detected. The computer program may include code for detecting a temporal change in the biometric image information with the first processor when the first processor is in the default mode, and code for configuring the first processor to operate in the high speed mode after the temporal change in the biometric image information is detected. The computer program may include code for determining a liveness score with the first processor when the first processor is in the high speed mode, and code for providing the liveness score to the second processor. The code for providing the feature extraction result and the feature matching result to the second processor may includes code for activating the second processor on or about the time the feature extraction result and the feature matching result are provided to the second processor, and code for deactivating the second processor on or about the time after the authentication score is determined. The code for configuring the first processor to operate in a default mode may decrease a power consumption of the first processor to be less than it is while in the high speed mode.

An example method for authenticating a biometric input according to the disclosure includes means for receiving the biometric input, means for performing a first authentication process on the biometric input with at least one application processor, such that the first authentication process generates one or more authentication parameters, means for providing the one or more authentication parameters to a secure processor, means for performing a second authentication process on the biometric input on the secure processor, such that the second authentication process utilizes the one or more authentication parameters, and means for outputting an authentication score based on the second authentication process.

An example method for managing latency and power in a heterogeneous distributed biometric authentication system according to the disclosure includes means for receiving biometric image information on a first processor and a second processor, such that the processing capability of the first processor is greater than the processing capability of the second processor, means for configuring the first processor to operate in a high speed mode, means for determining a feature extraction result and a feature matching result with the first processor, such that the feature matching result is based on a comparison of the received biometric image information and a previously stored biometric template, means for providing the feature extraction result and the feature matching result to the second processor, means for configuring the first processor to operate in a default mode, such that the processing capability of the first processor while in the default mode is less than it is while in the high speed mode, and means for determining an authentication score with the second processor, such that the authentication score is based at least in part on the feature matching result determined on the first processor.

Items and/or techniques described herein may provide one or more of the following capabilities and/or possibly one or more other capabilities not mentioned. Security of data processing devices may be improved. Spoofed biometric inputs may be detected. The latency associated with biometric authentication may be reduced. The power consumed by a data processing device may be reduced. The accuracy of biometric authentication may be improved. A heterogeneous computing architecture including a secure processor may be realized. The required die area, and corresponding costs, for secure processing may be reduced. Authentication algorithms may be scaled to include multi-modal sensors. Further, it may be possible for an effect noted above to be achieved by means other than they noted and a noted item/technique may not necessarily yield the noted effect.

BRIEF DESCRIPTION OF THE DRAWINGS

FIG. 4 is an exemplary joint latency management diagram for a distributed fingerprint authentication system.

DETAILED DESCRIPTION

Figure 1:
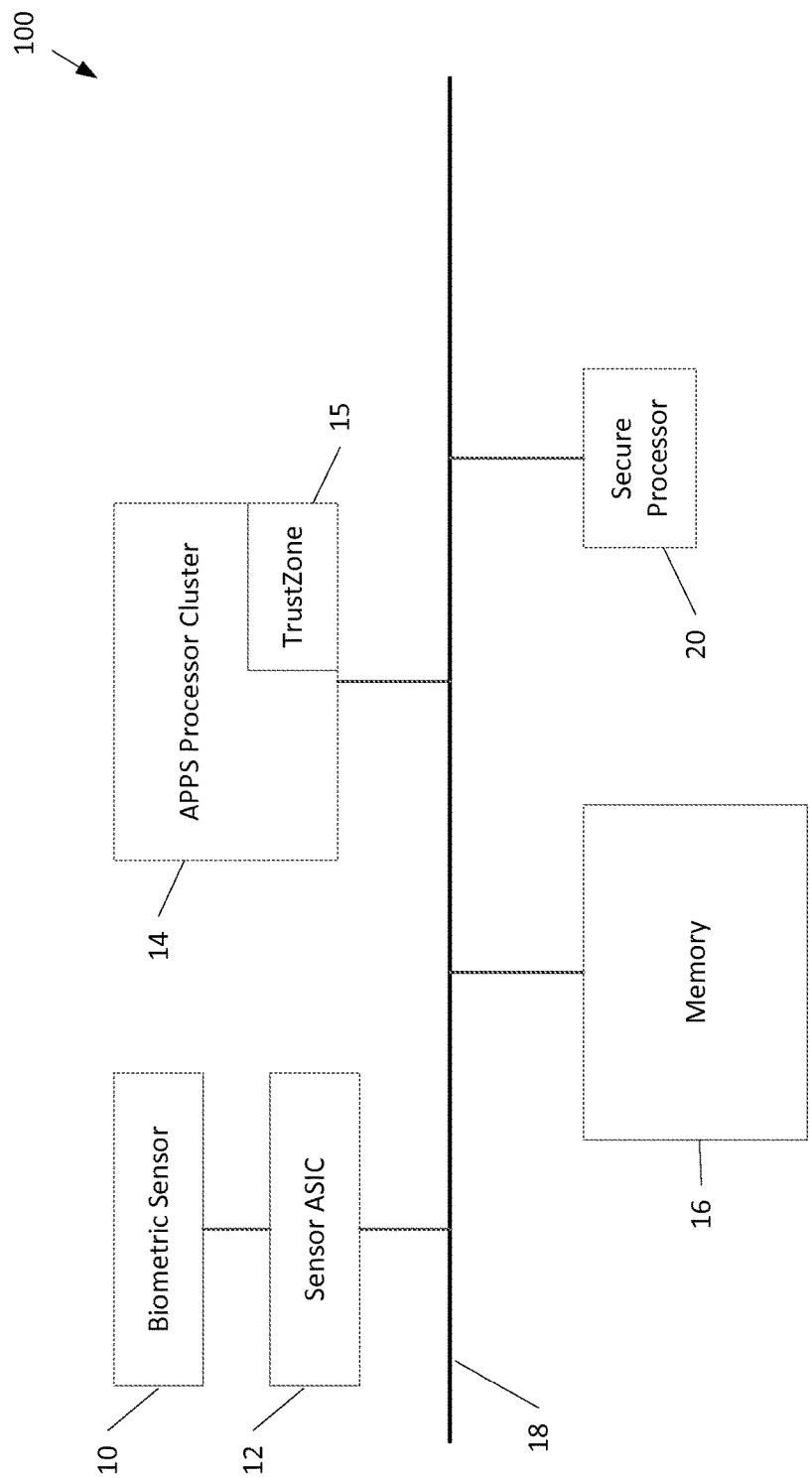
FIG. 1 is a simplified block diagram of distributed processors in a biometric authentication system.

Techniques disclosed herein are configured to improve the integrity and performance of biometric security processes on data processing devices. Biometric authentication systems are vulnerable to hacker attacks, potentially resulting in the loss of biometric data and unauthorized access to other sensitive data. Some biometric authentication systems utilize software implemented in a secure processing environment such as the ARM TrustZone® (TZ) to minimize such attacks. In general, a TZ is shared with several applications developed by several parties. In some cases, the size of TZ applications and number of TZ applications may be large. The increased demand on the TZ may increase the opportunities for malware to infect the TZ and increase the potential for attacks on a biometric authentication system. A distributed biometric authentication including a Secure Processor (SP) can circumvent the security problems posed in a TZ. The SP provides additional processing capabilities that may be independent of the TZ. The SP is typically comprised of one or more processors that may be significantly inferior (e.g., ¹⁄₂₀th of the TZ processing capability, and 256 KB run-time memory). The SP may run scaled down authentication algorithms. As a benchmark, a current generation fingerprint systems may consume a single ARM A57 processor core running at 2.5 GHz, and require approximately 350 ms to complete fingerprint processing. A typical solution may also use processing enhancements, such as hardware vectorization, to meet the end to end latency requirements. This level of continuous processing power, however, may create problems for power sensitive mobile applications.

In an embodiment, an image pre-processor running in the TZ may prepare fingerprint images for liveness detection and feature matching. The TZ may be configured to perform feature matching and liveness detection. The feature extraction and matching algorithms may include keypoint detection, keypoint feature description, feature matching (e.g., match keypoint descriptions against enrolled templates). Complex versions of algorithms with high matching and liveness accuracies may be used on the TZ. In an example, reduced complexity versions (e.g., such as utilized by the SP) may execute on the TZ to perform data integrity checks. The SP may be configured to determine match and liveness scores from sensor inputs and TZ module outputs. Fingerprint image formation algorithms may use input from sensor raw image frames based on the TZ outputs. Feature extraction, feature matching and liveness detection algorithms may also use the TZ module outputs. Examples of TZ to SP signaling may include image formation parameters (gain, offset), dead pixel and object/finger masks from image pre-processor, keypoint location and keypoint strength from a keypoint detection module, descriptor strength/quality from feature description module, feature vector, in-plane rotation angle, template association and keypoint association to template features from feature matching module, and liveness features and parameters from a liveness detection module.

The SP may be configured to independently verify the inputs received from the TZ (e.g., security/data integrity check). The feature vectors received from the TZ may be compared against feature vectors generated on SP. The feature vectors and parameters may be obscured and further protected with checksums or other cryptographic techniques. A reduced set of feature vectors may be generated in the SP from the sensor data. In an example, the feature vectors may be encrypted. Match scores received from the TZ may be compared to match scores generated in the SP to detect a TZ security compromise. A liveness score from received from the TZ may be compared to a liveness score generated in the SP. In an example, the SP may fuse various TZ and SP scores to form a single authentication score. The processing load on the SP may be minimized by the use of TZ to SP signaling because of ordering and pruning the number of keypoints and descriptor lengths, and by producing match point association to template points.

Referring to FIG. 1, a simplified block diagram of distributed processors in a biometric authentication system 100 is shown. The biometric authentication system 100 includes a biometric sensor 10, a sensor Application-Specific Integrated Circuit (ASIC) 12, a memory 16, an applications (APPS) processor cluster 14 including a TrustZone 15, a bus 18 and a secure processor 20. The biometric authentication system 100 may be a System on Chip, and may be part of a larger data processing device (e.g., smartphone, tablet, computer). In an example, the APPS processor cluster 14 and secure processor 20 may be multiple processing units installed on one or more Printed Circuit Boards (PCB). The biometric sensor 10 and the sensor ASIC 12 may include iris or retina eye-scan technology, face technology, hand geometry technology, spectral biometric technology, and fingerprint technology, for example. To the extent the present description describes fingerprint-based systems, such description is intended to be but one example of a suitable system. The scope is not so limited. Examples of a biometric sensor 10 may include optical, injected radio frequency (RF), or capacitive scanner disposed in a housing which provides a contact area where placed or swiped fingerprints are captured. The APPS processor cluster 14 may comprise multiple processors and incorporate the ARM® big.LITTLE™ power optimization technology. The APPS processor cluster 14 may also include a Trusted Execution Environment (TEE) such as the ARM Trust-Zone® technology which may be integrated into the APPS processor cluster 14. That is, the APPS processor cluster 14 may be configured to be/include a TrustZone 15 (TZ). The memory 16 may be double data rate synchronous dynamic random-access memory (DDR SDRAM). The APPS processor cluster 14 may be configured to read and write to the memory 16 via the bus 18. The secure processor 20 may be a relatively smaller processor, such as an ARM® SecureCore SC300 processor, and is configured to receive information from the APPS processor cluster 14, the memory 16, and the ASIC 12. Other examples of the secure processor 20 include, but are not limited to, the Infineon SLE97400SE/SD processor and the Oberthur Technologies Pearl embedded secure element.

The secure processor 20 may conform to the GlobalPlatform secure element (SE) criterion, and may include different form factors such as a Universal Integrated Circuit Card (UICC), embedded SE and microSD. In an example, the secure processor 20 may be a specialized security processor such as put into smart cards and payment systems. For example, the credit cards used in the European Chip and Pin system include a specialized security processor. These specialized security processors include designs to resist attack and compromise. A specialized security processor may include a light sensor configured to detect an attack when the top of the chip is removed and manipulation of the circuits is attempts. Attackers may try to induce a specialized security processor to execute incorrectly by manipulating the clock, the voltage supply, the temperature and such. If successful the incorrect execution may allow an attacker to access secrets the specialized security processor stores and processes. To defend against this the security process may have error detection and error correction on internal memory, CPU registers and on buses and interconnects. A specialized security processor may also have a temperature sensor and special circuits to detect clock and power manipulation attacks. Other features are also possible.

In general, an application processor (e.g., included in the APPS processor cluster 14) may be designed to be as fast, power efficient and inexpensive as possible. Adding the features included in specialized security processors, such as error correction to memory, buses and registers may significantly impact the performance (e.g., speed, power consumption) and manufacturing cost. Other hardware defenses may also drive up the cost of secure processors relative to general application processors. The software executing on a specialized secure processor may be highly constrained, and very thoroughly tested. The specialized software is usually within the domain of computer security professionals and is designed such that it has very few flaws and may survive a hack attack. In contrast, an application processor is generally required to execute a wide array of software, which may or may not have been written with the security of the system in mind.

In operation, the biometric authentication system 100 may be configured to perform image pre-processing, feature extraction, and feature matching. Further, some systems may also be configured to perform liveness detection. The TZ 15 (i.e., the APPS processor cluster 14) and the secure processor 20 are configured for inter-processor communication. Further, the secure processor 20 and TZ 15 may be configured to read raw image frames from the biometric sensor 10 (e.g., via the ASIC 12). In an embodiment, a fully functioning biometric authentication system runs on the TZ. Since the TZ 15 runs on the powerful APPS processor cluster 14, the processors within the APPS processor cluster 14 may be set to a performance mode, when required, to minimize processing latency with the TZ 15. The TZ 15 may share the results to secure processor 20 to direct or localize the processing on secure processor 20. For fingerprint recognition, the localization parameters may include image formation parameters, keypoints and strength scores, feature vector method (rotation, type), template association and keypoint association. Other localization parameters may be used with other biometric technologies. The secure processor 20 may be configured to perform data integrity checks of parameters from the TZ 15. The secure processor 20 may also be configured to determine feature vectors and match/liveness score using reduced complexity authentication algorithms due to the availability of localization information (i.e., received from the TZ 15). In an example, the secure processor may generate an authentication score to indicate a confidence in the biometric input. The secure processor 20 may also be configured to fuse the authentication score computed on the secure processor 20 with the authentication score computed on the TZ 15 to produce final authentication score.

Figure 2:
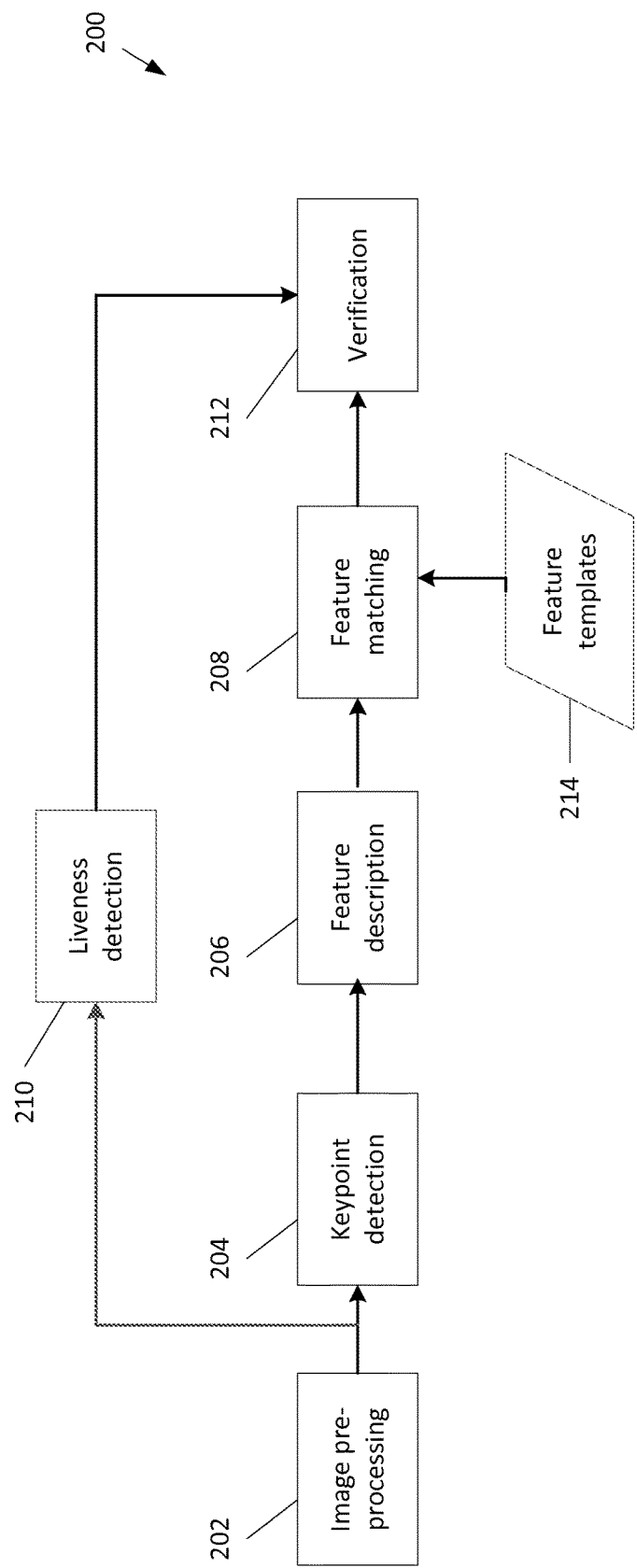
FIG. 2 is a functional block diagram of an exemplary fingerprint authentication system.

Referring to FIG. 2, with further reference to FIG. 1, a functional block diagram of an exemplary fingerprint authentication system 200 includes the stages shown. The TZ 15 operating within the APPS processor cluster 14 and the memory 16 may be configured to execute the stages in the fingerprint authentication system 200. The system 200, however, is exemplary only and not limiting. The system 200 may be altered, e.g., by having stages added, combined, removed, or rearranged. For example, the liveness detection stage 210 may be performed in sequence with the feature matching stage 208, or it may be performed in parallel with the other stages.

At stage 202, the TZ 15 may be configured to receive raw biometric image information from the biometric sensor 10, via the sensor ASIC 12, and perform image pre-processing. The received biometric image information may be one or more raw images captured by the biometric sensor 10, and the image pre-processing may combine and normalize the sensor images. For example, the pre-processing may apply gains and offsets to correct the image based on signal strength, and/or sensor quality. The pre-processing may include contrast enhancement algorithms and may remove non-fingerprint related information from the image (e.g., mask creation). Dead pixels, the areas where the pixels are not detected, may be corrected. The image pre-processing stage outputs a fingerprint image to the keypoint detection stage 204 and the liveness detection stage 210.

At stage 204, the TZ 15 is configured to perform a keypoint detection process on the image received from the image pre-processing stage 202. In a keypoint detection process for a fingerprint scanning application, the keypoints such as minutiae, or finger print features (e.g., crossover, core, island, delta, pore), or general image features (i.e., subject to a pattern recognition application) are identified. Other keypoints associated with other biometric inputs may be used. In general, keypoints are clear areas within in the image which are identifiable and may be used to match images with previously stored templates. Multiple keypoints may be detected at stage 204.

At stage 206, the TZ 15 may be configured to associate feature descriptions with the detected keypoints. The feature descriptions associated with a keypoint may be a rotation angle, pixel values, gradient values, or other information associated with the keypoint. The feature description may describe the area around a keypoint based on previously established guiding principles. In the fingerprint example, the guiding principles may be established fingerprint classifications such as minutiae, crossover, core, bifurcation, ridge, valley, island, delta, and lake. Other feature descriptions and guiding principles may be used for other biometric inputs. The feature description may include a descriptor strength, which may be used for keypoint ordering and pruning.

At stage 208, the TZ 15 may be configured to perform a feature matching between the feature descriptions determined at stage 206, and the previously stored feature template at stage 214. A data processing device configured with a fingerprint sensor generally will include a collection of previously recorded fingerprint images (i.e., feature templates 214). The TZ 15 is configured to determine if there is a match with the stored feature templates. The matching is preferably performed by comparing the feature descriptors (e.g., determining if the keypoints on the new image match the keypoints in the template). The feature matching is not limited to keypoint comparisons, however, as other image processing techniques to compare two images may also be used (e.g., phased based, edge detection, segmentation). The output of the feature matching 208 is a match score which represents a confidence level that the image received from the biometric sensor 10 matches a previously stored feature template.

At stage 210, the TZ 15 may be configured to perform a liveness detection process. A liveness process is used to determine if the biometric input has been spoofed or not. The liveness detection may rely on proprietary feature descriptions that are unique to live and/or spoofed images. In an example, a fingerprint image may contain several localized feature points the may demonstrate the liveness of fingers. Features such as pore distribution, ridge sharpness, and geometry of the ridge-valley boundary may be too small to be copied by a fake finger (e.g., wax, clay, silicone, etc.). Historical images (e.g., prior biometric scans of a user) may be analyzed to detect changes over time. Liveness detection may rely on other sensors (e.g., body temperature, a facial recognition device, keypad input). The output of the liveness detection is a liveness score which represents a level of confidence that a fingerprint image was taken of a real finger. The liveness score and the match score may be combined and verified at stage 212. The TZ 15 is configured to authenticate the received biometric information (e.g., fingerprint scan) based on the match and liveness scores. For example, predetermined thresholds may be established for each score, and authentication is verified (i.e., approved) if the scores are greater than the threshold. Other statistical methods may be used to validate the match and liveness scores.

Figure 3A:
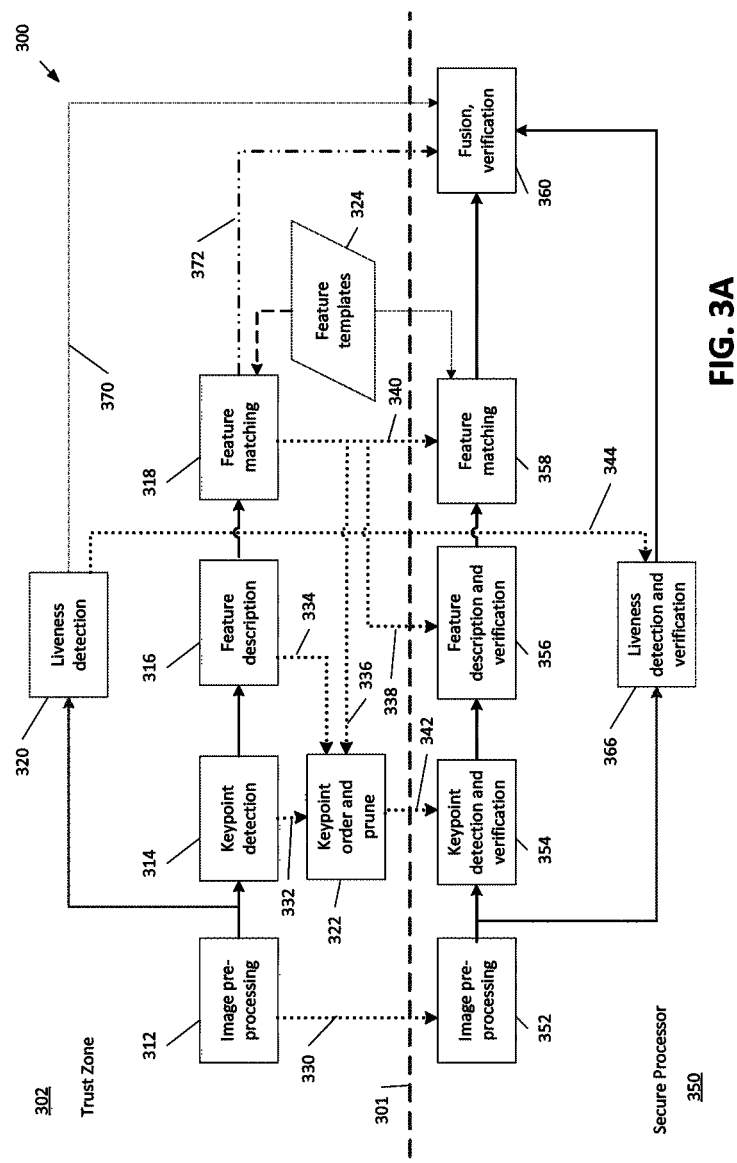
FIG. 3A is a functional block diagram of an exemplary distributed fingerprint authentication system.

Referring to FIG. 3A, with further reference to FIGS. 1 and 2, a functional block diagram of an exemplary distributed fingerprint authentication system 300 includes the stages shown. The system 300, however, is exemplary only and not limiting. The system 300 may be altered, e.g., by having stages added, combined, removed, or rearranged. FIG. 3A is divided by a conceptual demarcation line 301 into a TrustZone lane 302 and a Secure Processor lane 350. Each of the lanes illustrate the stages which are performed in the TrustZone 15 (TZ) (e.g., the APPS processor cluster 14) and the secure processor 20, respectively. The security of the biometric authentication process is improved if results are computed on the secure processor 20. In an embodiment, Boolean information is not sent from the TZ 15 to the secure processor 20 because variables may be attacked by malware on the way to the secure processor. The process flow arrows from the TrustZone lane 302 to the Secure Processor lane 350 represent configuration information flowing into the secure processor. They generally will not contain verification results or additional verification data. The process flow arrows configure the secure processor and provide the secure processor with information to enable the secure processor to accomplish an authentication task in a smaller amount of time (i.e., as compared to running a full authentication algorithm with the limited processing power of the secure processor 20).

At stage 312, the TZ 15 may be configured to receive raw biometric image information from the biometric sensor 10, via the sensor ASIC 12, and perform image pre-processing. The received biometric image information may be one or more raw images captured by the biometric sensor 10, and the image pre-processing stage 312 may combine and normalize the sensor images. For example, the pre-processing may apply gains and offsets to correct the image based on signal strength, and/or sensor quality. The pre-processing may include contrast enhancement algorithms, and removal of non-fingerprint related information from the image (e.g., mask creation). Dead pixels, the areas where the pixels are not detected, may be corrected. The image pre-processing stage 312 outputs an image to the keypoint detection stage 314 and the liveness detection stage 320. The image pre-processing stage 312 provides the values for the image processing 330 to the image pre-processing stage 352 operating on the secure processor 20. For example, the values for the image processing 330 may include gain, offset, dead pixel mask and the object/finger masks. The image pre-processing at stage 312 utilizes the relatively high processing capability of the TZ 15 (e.g., the APPS processor cluster 14) to perform the computational intensive algorithms required to determine the values for the image processing 330. The relatively smaller secure processor 20 is thus unburdened from determining these values and may utilize the values to verify that an acceptable image is generated.

At stage 314, the TZ 15 is configured to perform a keypoint detection process on the image received from the image pre-processing stage 312. In a keypoint detection process for a fingerprint scanning application, the keypoints such as minutiae, or finger print features (e.g., crossover, core, island, delta, pore), or general image features (i.e., subject to a pattern recognition application) are identified. Other keypoints associated with other biometric inputs may be used. In general, keypoints are clear areas within in the image which are identifiable and may be used to match images with previously stored templates. Detected keypoints may be weighted based on image clarity, location in the image, size. A keypoint strength variable may be assigned to the keypoints. Other weighting factors may be used. Multiple keypoints may be detected at stage 314 and the associated locations and keypoint strength information 332 may be provided for ordering and pruning at stage 322.

At stage 316, the TZ 15 may be configured to associate feature descriptions with the keypoints detected at stage 314. As examples, and not limitations, the feature descriptions associated with a keypoint may be a rotation angle, pixel values, gradient values, or other information associated with the feature. The feature description may describe the area around a keypoint based on previously established guiding principles. In the fingerprint example, the guiding principles may be established fingerprint classifications such as minutia, crossover, core, bifurcation, ridge, valley, island, delta, and lake. Other feature descriptions and guiding principles may be used for other biometric inputs. The feature description may include a descriptor strength 334, which may correspond to the relative reliability of the different features for use in image matching. The descriptor strength may be used for keypoint ordering and pruning at stage 322.

At stage 318, the TZ 15 may be configured to perform a feature matching between the feature descriptions determined at stage 316, and the previously stored feature templates at stage 324. A data processing device configured with a fingerprint sensor generally will include a collection of previously recorded fingerprint images (i.e., feature templates). The TZ 15 is configured to determine if the detected keypoints match with keypoints in the stored feature templates. The matching is preferably performed by comparing the feature descriptors (e.g., determining if the keypoints on the new image match the keypoints in the template). A keypoint match score 336 may be provided to order and prune the keypoints at stage 322. Additional signals such as matched keypoints may be used for pruning at stage 322. Signals containing match scores, feature vectors and template associations may be provided to the secure processor

20. Other signals may include information such as image angle/rotation between an input image and a template (e.g., when different from a keypoint orientation/angle). For example, feature vectors 338, including rotation angles, and template associations 340, which are determined at stage 318 may be provided to the secure processor 20. A match score 372 may optionally be provided to the secure processor 20.

At stage 320, the TZ 15 may be configured to perform a liveness detection process (i.e., to determine if the biometric input has been spoofed as described at stage 210). A signal containing liveness features 344 may be provided to the secure processor 20. A liveness score 370 may optionally be provided to the secure processor 20 for verification and/or fusion to determine an authentication score.

The stages executing in the secure processor lane 350 represent scaled down processes which may utilize the results computed in the TZ 15. The secure processor 20 may perform similar processes using the results received from the TZ 15 to verify those results. For example, if the secure processor 20 receives a keypoint location and description from the TZ 15, the secure processor 20 may be configured to analyze the image at that location and determine if a keypoint exists, and if so, determine if the image of the keypoint matches the expected description. At stage 352, the secure processor 20 may be configured to receive raw biometric image information from the biometric sensor 10, via the sensor ASIC 12, and perform image pre-processing. The secure processor 20 is also configured to receive the values for image processing 330 from the TZ 15 and may utilize those values for the image pre-processing. The image pre-processing stage 352 may use all or only part of the values for image processing 330 received from the TZ 15. In the fingerprint example, if there is a large fingerprint sensor and only about ⅓ of the sensor area is used by a fingerprint, then the secure processor 20 may use received object mask information (i.e., part of the values for image processing 330) to determine the gain compensation. The gain compensation value determined by the secure processor 20 may be compared to a corresponding value received from the TZ 15. An image output from stage 352 may be used for keypoint detection and verification at stage 354.

At stage 354, the secure processor 20 may be configured to compare a pruned list of keypoints 342 received from the TZ with an image received from the image pre-processing stage 352. The TZ 15 may detect a relatively large number (e.g., 50, 100, 200, 300) of keypoints at stage 314. The relatively large number of keypoints may be pruned and ordered at stage 322. The pruning may be based on feature strength, location within an image, relative position and/or type of neighboring features, image quality, and other factors. A subset of the strongest keypoints may be used by the secure processor 20. The subset of strongest keypoints may be a relatively smaller number of keypoints (e.g., 5, 10, 20, 50). For example, the keypoint locations could be passed to the secure processor 20 and the locations may be verified as being keypoints. If secure processor 20 cannot verify a correlation between a keypoint and the location, then it may indicate that TZ 15 data has been tampered with. The verified keypoints may be provided for feature description and verification at stage 356.

At stage 356, the secure processor 20 may be configured to determine and verify feature descriptions. The secure processor 20 may independently determine the feature descriptions for each of the keypoints in the subset of strongest keypoints received from stage 354 and verify the feature vectors 338 received from the TZ 15. If the signals received from the TZ 15 do not corroborate with the results of the processing on the secure processor 20, then the secure processor 20 may be configured to assign a failing authentication score to the biometric input. A set of verified keypoint descriptors may be provided to a feature matching algorithm at stage 358.

At stage 358, the secure processor 20 may be configured to execute a feature matching algorithm on the feature descriptions determined at stage 356 and previously stored feature templates at stage 324. The template association may be based on the signals received from the TZ 15. For example, the template associations 340 generated at stage 318 may be used at stage 358. The secure processor 20 may be configured to determine if the subset of strongest keypoints match with keypoints in the associated template. The matching may be performed by comparing the feature descriptors. The secure processor 20 may generate a match score based on the result of the feature matching at stage 358. The match score may be combined with liveness results generated at stage 366.

At stage 366, the secure processor 20 may be configured to perform a liveness detection process. As described above, the liveness process is used to determine if the biometric input has been spoofed or not. The secure processor 20 may receive signals from the TZ 15 including liveness features 344 determined at stage 320. The liveness features 344 may include proprietary feature descriptions that are unique to live and spoofed images, or a summary of historical keypoint information (e.g., based on prior biometric scans of a user). The liveness features 344 may include information received from other sensors (e.g., body temperature, a collocated facial recognition camera, keypad input). The secure processor 20 may be configured to independently determine a liveness score based on the biometric input, and verify the received liveness features 344. In an embodiment, the liveness score generated at stage 366 may be combined with the match score generated at stage 358 to determine an authentication score. That is, the authentication of the biometric input is based solely on the results of the liveness and match score computed on the secure processor 20. In another embodiment, the secure processor may include fusion and verification algorithms at stage 360. Stage 360 is optional. The match score 372 and the liveness score 370 calculated in the TZ 15 may be provided to the secure processor 20 and combined with the matching score generated at stage 358 and the liveness score generated at stage 366. A misalignment (i.e., differing values) between the TZ and secure processor inputs may result in a low authentication score (i.e., failing the biometric input). The secure processor 20 is configured to output the authentication score.

Figure 3B:
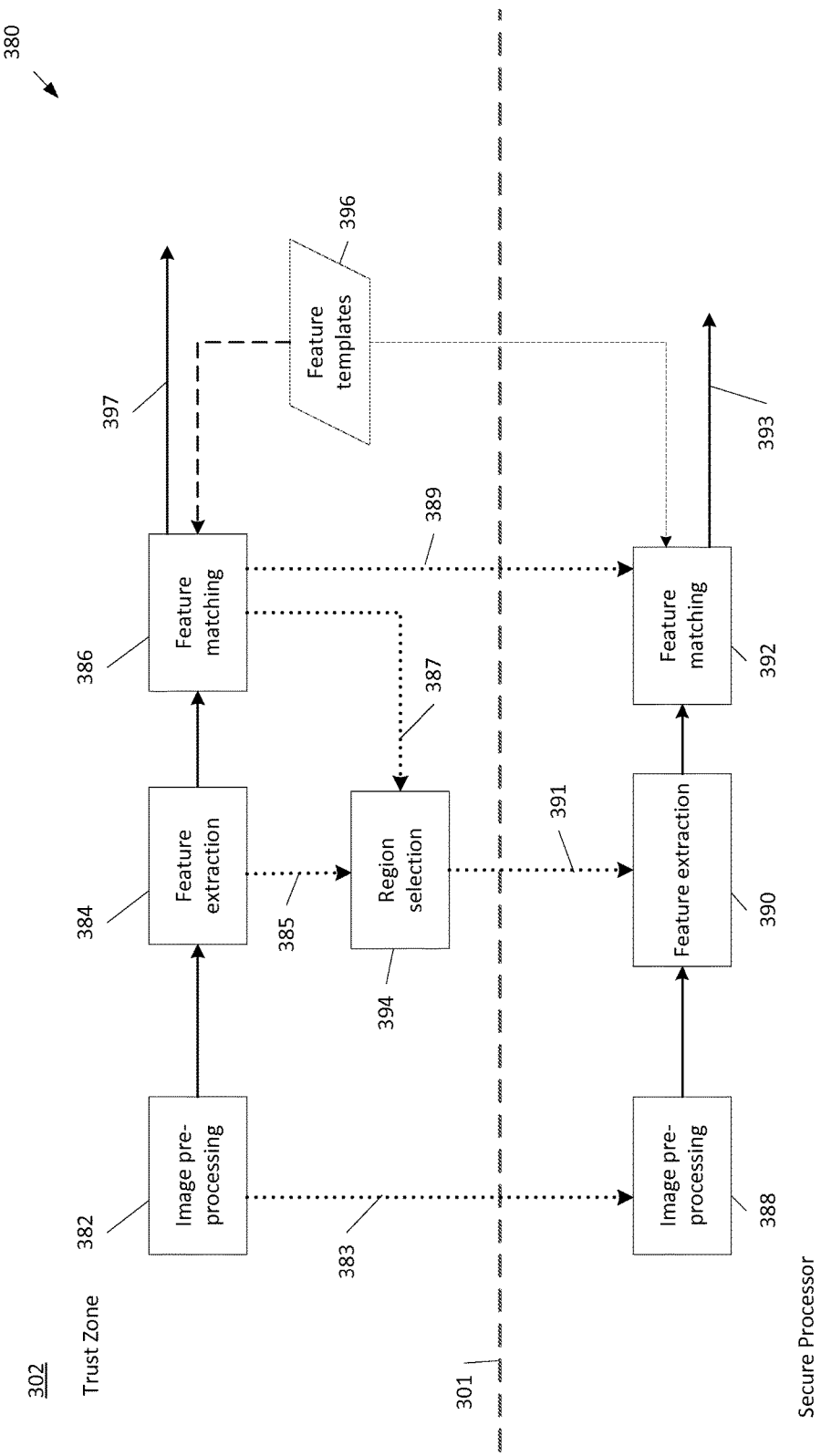
FIG. 3B is a functional block diagram of an exemplary distributed large area fingerprint authentication system.

Referring to FIG. 3B, with further reference to FIGS. 1, 2 and 3A, a functional block diagram of an exemplary distributed large area fingerprint authentication system 380 includes the stages shown. The system 380, however, is exemplary only and not limiting. The system 380 may be altered, e.g., by having stages added, combined, removed, or rearranged. For example, the system 380 may include one or more liveness detection modules which are not shown. FIG. 3B is divided by a conceptual demarcation line 301 into a TrustZone lane 302 and a Secure Processor lane 350. Each of the lanes illustrate the stages which are performed in the TrustZone 15 (TZ) (e.g., the APPS processor cluster 14) and the secure processor 20, respectively.

At stage 382, the TZ 15 may be configured to receive raw biometric image information from the biometric sensor 10, via the sensor ASIC 12, and perform image pre-processing. The image pre-processing is dependent on the type of biometric sensor (e.g., pre-processing for an ultrasonic fingerprint sensor may vary from the pre-processing required for an Infrared sensor, etc. . . . ). The system 380 may receive the biometric image information from a large area sensor (e.g., 1"×1"). The image pre-processing stage 382 outputs an image to the feature extraction stage 384. In an example, the image information may also be provided to a liveness detection stage (not shown). The image pre-processing stage 382 provides the values for the image processing 383 to the image pre-processing stage 388 operating on the secure processor 20. For example, the values for the image processing 383 may include gain, offset, and filter coefficients. Other values may be used based on the configuration and capabilities of the biometric sensor 10. As described with regards to the process 300, the image pre-processing at stage 382 utilizes the relatively high processing capability of the TZ 15 (e.g., the APPS processor cluster 14) to perform the computational intensive algorithms required to generate the values for the image processing 383.

At stage 384, the TZ 15 may be configured to detect one or more features within the image information. In a large area fingerprint application, the feature extraction may be based primarily on locating the minutiae rather than using a general pattern matching algorithm. One or more areas with sufficient separation and density of minutiae may be identified and provided to for feature matching at stage 386. The feature extraction information 385 (e.g., feature vectors) may optionally be provided to a region selection stage 394. The feature matching stage 386 may access the stored feature templates 396 and identify a matching image based on the extracted features. Template association information 389 (e.g., template id, rotation angle, translation) may be provided to the secure processor 20 to facilitate feature matching with a smaller processor. The feature vector information and corresponding match scores 387 utilized by the feature matching stage 386 may be provided for region selection at stage 394. The feature matching stage 386 may optionally generate and output a feature match score value 397. At stage 394, the TZ 15 may be configured to select on or more regions in the image information based on the feature matching and/or feature extraction processes. In a large area image, the selected regions may be based on the location and density of minutiae within one or more areas of the image. The selected regions are provided to the secure processor 20 to expedite the feature extraction processing (i.e., reduce the computational load) at stage 390. The region selection information 391 may indicate areas within the image, or may be binary image data of the selected regions.

At stage 388, the secure processor 20 may be configured to receive the image information from the biometric sensor as well as the values for the image processing 383 generated in the TZ 15 (i.e., on the APPS processor 14). The values for the image processing 383 may include parameters such as gain, offset and other filter coefficients. The processed image information is provided for feature extraction at stage 390. The processed image information may also be provided to a liveness detection module (not shown on FIG. 3B). At stage 390, the secure processor 20 extract features from the image based on the region selection information 391 received from the TZ 15. The secure processor may verify that the features variables (e.g., separation, density) on the image correspond with the region selection information 391 received from the TZ 15. The image and feature extraction information are provided to the feature matching stage 392. The feature matching on the secure processor 20 utilizes the template information calculated on the TZ 15 to determine a match. That is, the secure processor performs a matching algorithm on one or more templates provided by the TZ 15 (i.e., the template association information 389) rather than searching all of the previously stored templates for a match. A match score output 393 may be provided for authentication as previously described. The match score output 393 may be adjusted based on the output of a liveness detection module (not shown in FIG. 3B).

Referring to FIG. 4, with further reference to FIGS. 1 and 3, an exemplary joint latency management diagram 400 for a distributed fingerprint authentication system is shown. The diagram 400 is presented in three horizontal streams including an ASIC stream 402, and TZ stream 404, and a SP stream 406, with each of the streams corresponding to the processing steps on the ASIC 12, TrustZone (i.e., the APPS processor cluster 14), and the secure processor 20, respectively. The diagram 400 illustrates a timeline 401 and the parallel processing streams between image acquisitions (i.e., ASIC 12), a secure fingerprint system (e.g., TZ 15), and an extra-secure light weight fingerprint system (i.e., secure processor 20). The processing times are approximate and provided as examples only. Other processing times may be used based on hardware configurations, biometric inputs and algorithms. The ASIC 12 drives the biometric sensor 10 and stores the results into the memory 16 (e.g., a DDR). The TZ 15 (i.e., the APPS Processor cluster 14) performs image pre-processing, feature matching and liveness detection. The TZ 15 aids the secure processor 20 with localization and input parameters. The secure processor 20 computes a match score using light weight algorithms. The TZ 15 may be configured to combine the match score from various processing systems. The secure processor 20 may be configured to verify data integrity of the inputs from the other system. The data messages sent from the TZ 15 to the secure processor 20 are complex, which may reduce the effectiveness of an attack on the localization parameters provided to the secure processor 20. In an embodiment, the data messages may include checksums or other cryptographic information.

In a fingerprint detection application, the ASIC stream 402 may include a sequence of image capture events (i.e., C1, C2, . . . C6) corresponding to input from a fingerprint sensor (i.e., the biometric sensor 10). The image capture information generated by the ASIC 12 is provided to the TZ stream 404 for image formation and liveness detection. The TZ stream 404 includes an Image Formation process (IF), an Air object Detection process (AD), a Finger Detection process (FD), a Minutiae Feature Extraction process (M FE), a Pattern Feature Extraction process (P FE), a Minutiae Matching process (MM), a Pattern Matching process (PM), a Minutiae and Pattern matching process (MP), an Image Pre-Processing process (IPP), and a Liveness process. The Image Formation process (IF) receives the captured image information from the ASIC stream 402. The captured image information may be the raw images obtained by the biometric sensor 10. The image frames may be provided individually, or may be received after combination by the ASIC 12. A collection of images received from the ASIC stream 402 may be used by the Image Pre-Processor (IPP) in the TZ stream 404 for liveness detection. The Image Formation process (IF) may provide the raw fingerprint images and image pre-processing variables to the SP stream 406.

The SP stream 406 may include an optional Image Formation process (IF) 406a, a Pattern Feature Extraction process (P FE), and Pattern Matching process (PM), and liveness detection process, and an optional mixing process (MIX). The optional Image Formation process (IF) 406a may receive raw image information 408 from the TZ 15 and may be configured to generate fingerprint images for subsequent processing in the SP stream 406. The Pattern Feature Extraction process in the SP stream 406 may optionally receive fingerprint images 410 from the TZ stream 404 after Air, Object, and Finger detection processes. In an embodiment, the secure processor 20 may be configured to receive both the raw image information 408 and the fingerprint images 410. The SP stream receives a reduced feature descriptor and location information 412 from the TZ stream 404. The reduced feature descriptor and location information 412 may include the subset of the strongest keypoints generated at stage 322. The SP stream performs the Pattern Feature Extraction process (P FE) and receives match parameters 414 from the TZ stream 404. The secure processor 20 is configured to utilize the match parameters 414 in the Pattern Matching process (PM), and to generate a match score. The SP stream 406 performs liveness detection on the images received from the TZ stream 404 to generate a liveness score.

Concurrent with the execution of the indicated processes in the SP stream 406, the TZ 15 is configured to perform liveness detection on the image information received from the ASIC stream 402. The TZ stream may optionally provide a match score (i.e., based on the MP process) and a liveness score to the SP stream. The MIX process in the SP stream 406 is optional, and may combine the match and liveness scores generated by the TZ 15 and the secure processor 20 to produce an authentication score.

Figure 5:
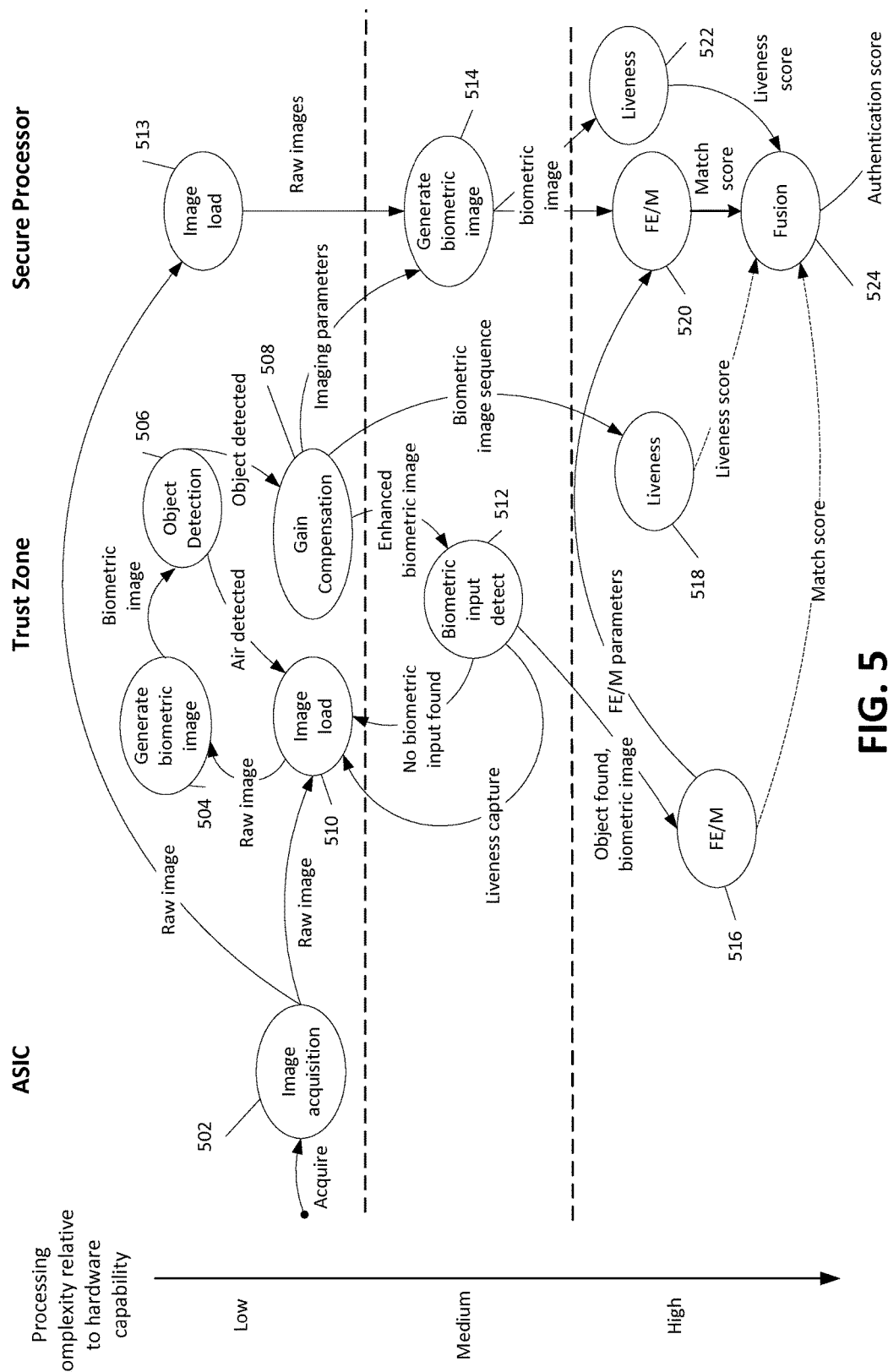
FIG. 5 is a state flow diagram for a distributed biometric authentication system.

Referring to FIG. 5, with further reference to FIG. 1, a state flow diagram for a distributed biometric authentication system is shown. The diagram provides an exemplary illustration of the module processing complexity and the state transitions of a fingerprint authentication system. The processor complexity is presented on a relative scale of Low, Medium, and High for each of the states. The diagram also demonstrates the control flow and task partitioning across the ASIC 12, the TZ 15 (i.e., APPS Processor Cluster 14), and the secure processor 20.

The ASIC 12 may maintain an image acquisition state 502 and is configured to acquire a biometric input (e.g., a fingerprint scan). The ASIC 12 provides the raw image information to the TZ and the secure processor. The TZ 15 may maintain an image load state 510 configured to receive image. The image information may include one or more captured image frames stored in the memory 16. The image load state 510 represents the management of the image files in the memory 16. The TZ 15 may be configured to maintain a generate biometric image state 504 to process the raw image information stored in memory 16. For example, a biometric image may include multiple raw images (e.g., multiple frames of capture by the biometric sensor 10). In the generate biometric image state 504, the TZ 15 may execute one more image formation algorithms to generate a biometric image. An object detection state 506 is configured to execute object detection algorithms to analyze the biometric image and determine if an object is present in the image. An output of the object detection state 506 may indicate that the biometric image does not contain an object (i.e., air is detected), and the TZ 15 may modify an air detected state variable associated with the biometric image. The image load state 510 may recognize the air detected state variable on the image to halt the processing of that particular biometric image. The TZ 15 may maintain a gain compensation state 508 to enhance the biometric image if an object is detected. Image enhancement may include, for example, a normalization process to modify image gain and offset parameters. Multiple biometric images may be fused to generate the enhanced image. Multiple biometric images may be analyzed by the TZ 15 in a liveness state 518 to determine a liveness score. The TZ 15 may be configured to analyze the enhanced biometric image in a biometric input state 512. A biometric input may be a fingerprint, and the biometric input state 512 may determine if an object in the enhanced biometric image is a fingerprint. If the enhanced biometric image does not include a biometric input, then a biometric input state variable in the image file may be updated to halt the image processing. If a biometric input is present, then the biometric input state variable may be updated accordingly and subsequent image processing (e.g., feature extraction and matching) may occur. An image with a biometric input may also be used for iterative liveness capture algorithms to create a sequence of biometric images. The TZ 15 is configured to perform feature extraction (e.g., keypoint detection) and matching in a Feature Extraction/Matching state 516. The TZ 15 may provide a match score and feature extraction and matching parameters associated with the biometric image to the secure processor.

The secure processor 20 may be configured to maintain an image load state 513 to manage the image files received from the ASIC 12. The secure processor 20 may access image files stored in memory 16. The secure processor 20 may generate a biometric image in a generate biometric image state 514 based on the image files and imaging parameters generated by the TZ 15. The secure processor 20 may perform feature extraction and matching algorithms in a feature matching and extraction state 520. The secure processor may utilize the feature extraction and matching parameters generated by the TZ 15 to produce a match score. In an example, the secure processor 20 may include a liveness state 522 configured to execute liveness algorithms on the generated biometric image. The liveness state 522 may receive liveness parameters from the TZ (not shown in FIG. 5) to compute a liveness score. The secure process may include a fusion state 524 configured to generate an authentication score. In an example, the authentication score is based on received match and liveness scores computed on the TZ 15, in combination with the match and liveness scores computed on the secure processor. In another example, the authentication score may be not include the scores calculated in the TZ 15.

Figure 6:
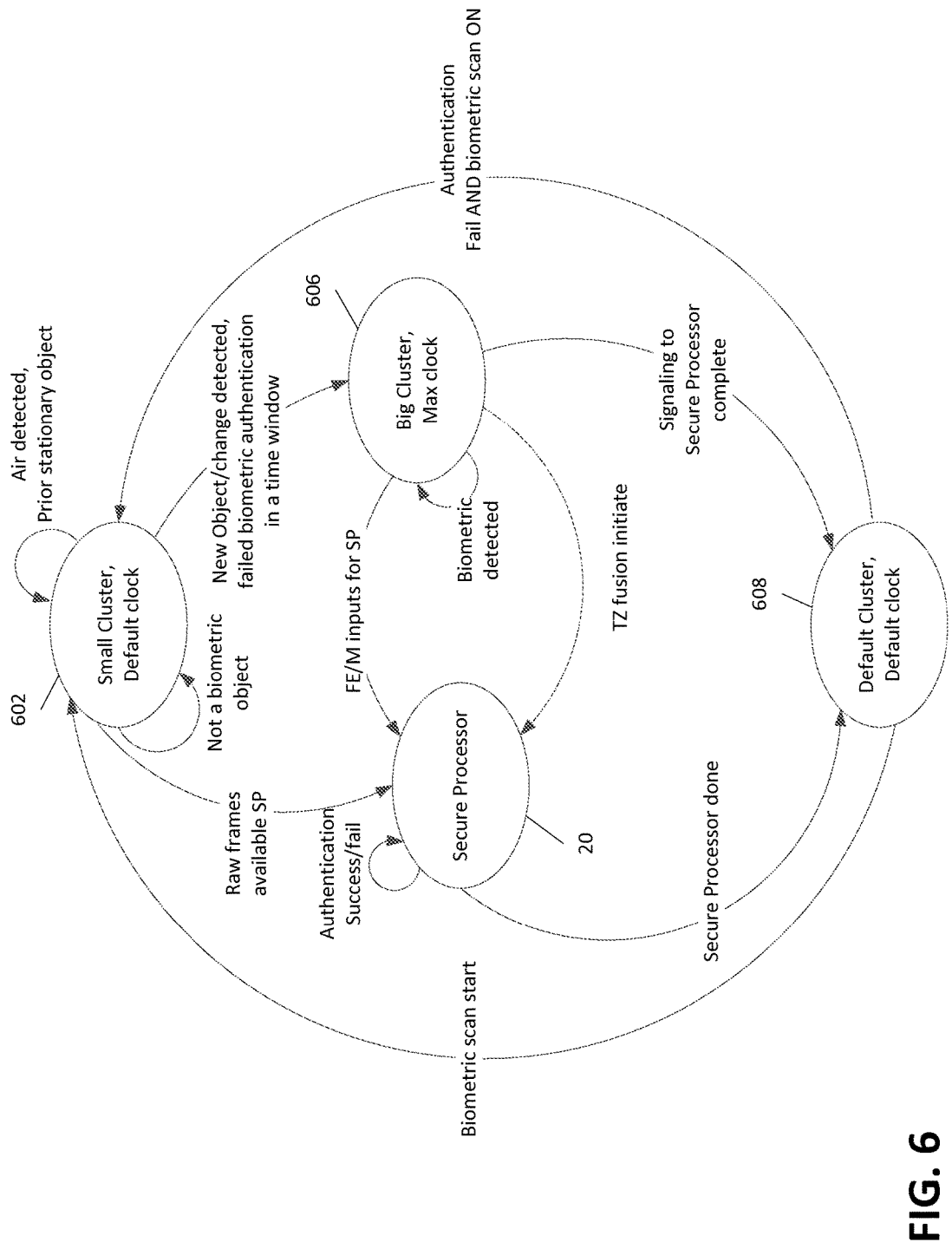
FIG. 6 is a processor state flow diagram for power/performance in a distributed biometric authentication system.

Referring to FIG. 6, with further reference to FIG. 1, a processor state flow diagram for power/performance in a distributed biometric authentication system is shown. To manage the APPS Processor cluster 14 power at an efficient level, the TZ algorithms are allotted to appropriate hardware and clocking. The hierarchical processing units in the biometric authentication systems drive a state machine of core affinity and clocking requirements based on their state, load, and input type. FIG. 6 demonstrates the latency and power management of a biometric authentication system on a distributed hardware platform. In an example, an ARM® big.LITTLE™ architecture coupled to a secure processor may be utilized. In general, a demand for a little-cluster means utilizing a little processor cluster within the biometric system. Based on concurrency, a scheduler may choose a little or big-cluster. The clock frequency (i.e., power-performance mode) request may be substituted based on concurrent applications. The biometric authentication system may start image acquisition (i.e., image formation and gain compensation) and object detection in a small cluster, default clock state 602. The TZ 15 portion of the APPS processor cluster 14 may be running at clock speeds determined on prior CPU utilization (i.e., referred to as Dynamic Clock and Voltage Scaling (DCVS)). If a new object (e.g., an object with a temporal change) is detected, a request for a big cluster, max clock state 606 is made. In this state, the TZ 15 portion of the APPS processor cluster 14 may be performance mode (e.g., max clock speed). The TZ 15 is configured to perform a biometric input detection (e.g., a finger detection process). If a biometric object is not detected, the TZ 15 portion of the APPS processor cluster 14 may return to a small cluster, default clock state 602 (i.e., DCVS). A change in biometric input to the biometric sensor 10 may trigger a core affinity and/or clocking change in the APPS processor cluster 14. For example, if a biometric input is detected, the TZ 15 portion of the APPS processor cluster 14 may enter a big cluster, max clock state 606 and feature extraction and matching algorithms are performed. The secure processor 20 may be turned ON when the TZ is preparing to pass imaging parameters. The secure processor 20 may be initiated to perform feature extraction and matching respectively as extraction and matching parameters are available in the TZ. TZ continues with liveness detection in the big cluster max clock state 606. When processing is complete, the TZ requests a default cluster and default clock state 608. The secure processor 20 may concurrently verify the parameters from TZ and perform feature extraction and matching. On completion of processing, the secure processor 20 may provide an authentication score (e.g., authentication success/fail) and then turn OFF. When the TZ has completed the signaling to the secure processor 20, the TZ 15 portion of the APPS processor cluster 14 may enter to a default cluster, default clock state 608. In an embodiment, the TZ 15 may optionally provide matching and liveness scores to the secure processor 20 to initiate a fusion of matching and liveness scores such that the authentication score is based on the fused scores. In either case, if the authentication score implies a failed attempt and if scan activated, the cycle repeats. Otherwise, the cycle exits with the authentication score.

Figure 7:
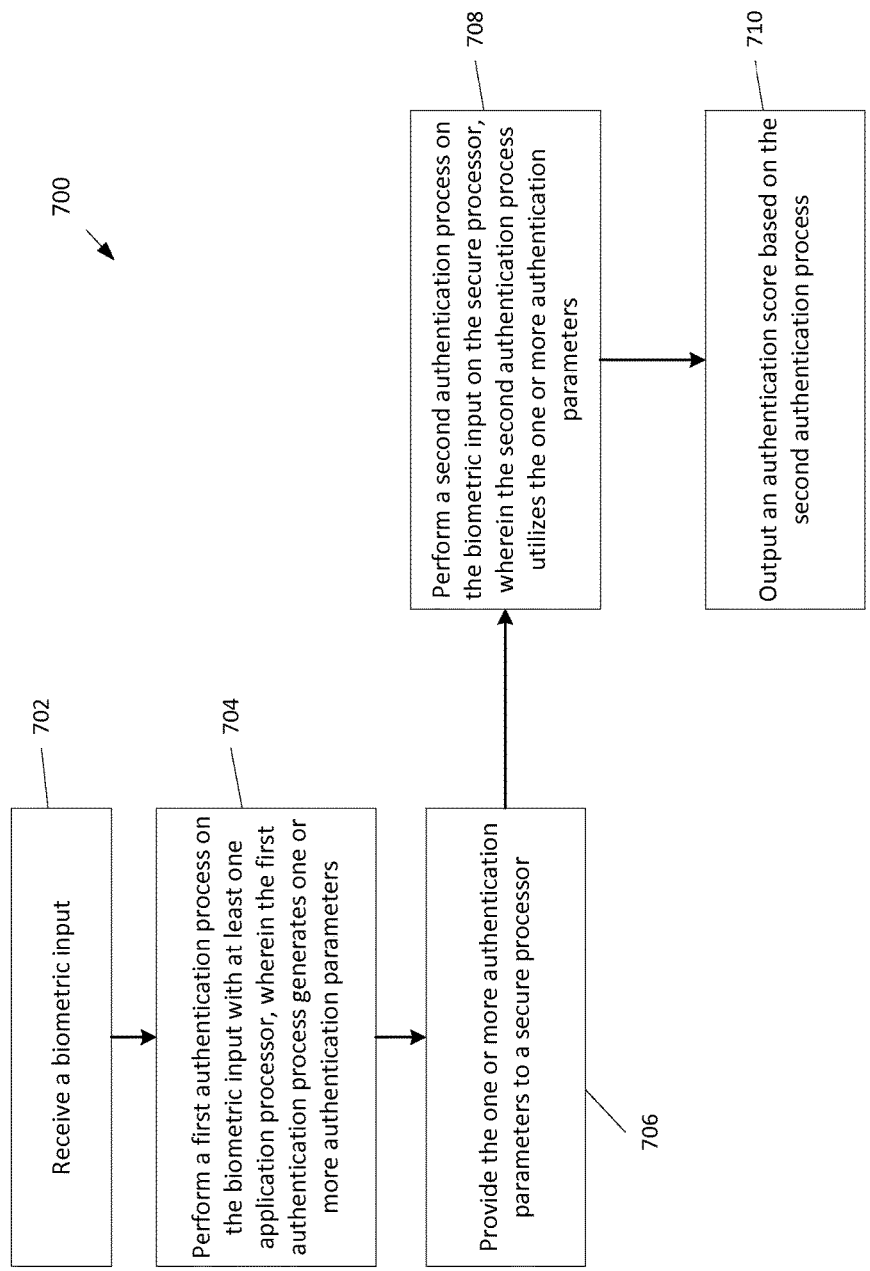
FIG. 7 is a flow diagram of a process for determining an authentication score with a distributed biometric authentication processor.

Referring to FIG. 7, with further reference to FIGS. 1-6, a process 700 for determining an authentication score with a distributed biometric authentication processor includes the stages shown. The process 700 is, however, an example only and not limiting. The process 700 can be altered, e.g., by having stages added, removed, rearranged, combined, performed concurrently and/or having stages split into multiple stages. In an embodiment, the biometric authentication system 100 may include processor executable instructions corresponding to the process 700 stored in the memory 16, and the APPS processor cluster 14 and the secure processor 20 may be configured to execute the instructions.

At stage 702, the biometric authentication system 100 may be configured to receive a biometric input. The biometric sensor 10 may be configured to receive an input such as a fingerprint, iris or retina eye-scan, a facial image, a hand image (e.g., hand geometry technology), or other biometric input. The sensor ASIC 12 may be configured to transform the biometric input into a computer readable format, such as an image file. The biometric sensor 10 and the sensor ASIC 12 may be a means for receiving a biometric input, or the biometric input may be received from another sensor or external imaging system. As an example, the biometric input may be a fingerprint image.

At stage 704, the biometric authentication system 100 may be configured to perform a first authentication process on the biometric input with at least one application processor, wherein the first authentication process generates one or more authentication parameters. The term application processor is not limited to a general purpose application processor and may include other Digital Signal Processors (DSPs). The APPS processor cluster 14 is an example of an application processor. The APPS processor cluster 14 may include a TrustZone 15 (TZ) component. The TZ 15 may be configured to perform the first authentication process including image pre-processing stage 312, keypoint detection stage 314, feature detection stage 316, feature matching stage 318, and liveness detection stage 320. The results of the first authentication process includes the one or more authentication parameters. In an example, the one or more authentication parameters may include image processing parameters such as gain, offset, dead pixel mask, and object masks. Other authentication parameters may include a pruned list of active areas, keypoint locations and the corresponding keypoint strength scores. Authentication parameters may include a matched pair, match angle, match scores, feature vectors, template associations, and liveness scores.

At stage 706, the TZ 15 may provide the one or more authentication parameters to the secure processor 20. In an example, the one or more authentication parameters are stored in the memory 16 when generated by the TZ 15. The authentication parameters may be contained in encrypted signals provided to the secure processor 20. The TZ 15 may be a means for performing a first authentication process on a biometric input and for providing the one or more authentication parameters to the secure processor 20.

At stage 708, the secure processor 20 may be configured to perform a second authentication process on the biometric input on the secure processor, wherein the second authentication process utilizes the one or more authentication parameters. The secure processor may be configured to execute scaled down authentication algorithms which may utilize the authentication parameters computed in the TZ 15 at stage 704. The second authentication process may calculate match and liveness scores. The second authentication process may include image pre-processing 352, keypoint detection and verification 354, feature description and verification 356, feature matching 358 and liveness detection 366. The image pre-processing algorithms may utilize the authentication parameters such as object mask information, gain values, and/or offset values. The keypoint detection and verification algorithms may utilize a pruned list of keypoints received from the TZ 15. The feature description and verification algorithms may access feature vectors computed on the TZ 15, and the feature matching algorithms may utilize the template association determined by the TZ 15.

At stage 710, the secure processor 20 may be configured to output an authentication score based on the second authentication process. The authentication score is an indication of the confidence of a match between the biometric input and a previously stored feature template. The authentication score may also incorporate a confidence value based on the liveness detection algorithm (i.e., a determination on whether the biometric input is from a live or spoofed source). In the process 700, the authentication score does not depend on the match and liveness scores generated in the TZ 15. That is, the authentication scores are not fused in an effort to minimize the potential harm of malware within the TZ 15. The secure processor 20 verifies the authentication parameters received from the TZ 15, and calculates the authentication score. The authentication score may be output to other applications within a data processing device to enable, or block, access to features or information stored on the device.

Figure 8:
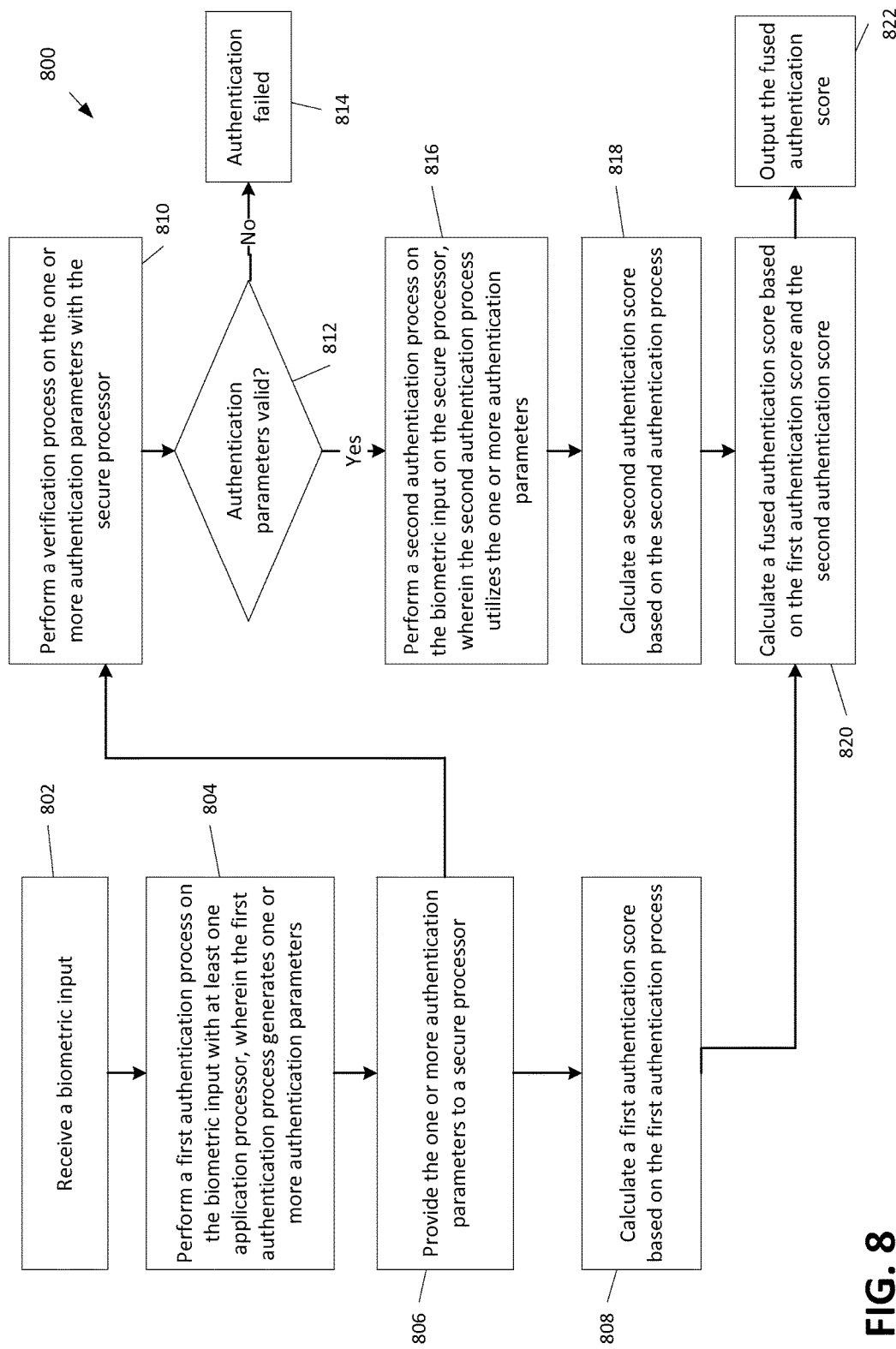
FIG. 8 is a flow diagram of a process for determining a fused authentication score with a distributed biometric authentication processor.

Referring to FIG. 8, with further reference to FIGS. 1-6, a process 800 for determining a fused authentication score with a distributed biometric authentication processor includes the stages shown. The process 800 is, however, an example only and not limiting. The process 800 can be altered, e.g., by having stages added, removed, rearranged, combined, performed concurrently and/or having stages split into multiple stages. For example, the verification process in stage 810 may be performed concurrently with the second authentication process in stage 816. In an embodiment, the biometric authentication system 100 may include processor executable instructions corresponding to the process 800 stored in the memory 16, and the APPS processor cluster 14, the TZ 15, and the secure processor 20 may be configured to execute the instructions.

At stage 802, the biometric authentication system 100 may be configured to receive a biometric input. As an example, the biometric input may be a fingerprint image. At stage 804, the biometric authentication system 100 may be configured to perform a first authentication process on the biometric input with at least one application processor, wherein the first authentication process generates one or more authentication parameters. The applications processor is the APPS processor cluster 14 which includes a TrustZone 15 (TZ) component. The TZ 15 may be configured to perform the first authentication process including image pre-processing stage 312, keypoint detection stage 314, feature detection stage 316, feature matching stage 318, and liveness detection stage 320. The results of the first authentication process includes the one or more authentication parameters. In an example, at stage 806, the TZ 15 may provide one or more authentication parameters including image processing parameters (e.g., gain, offset, dead pixel mask, and object masks), a pruned list keypoint locations and the corresponding keypoint strength scores, match scores, feature vectors, template associations, and liveness scores to the secure processor 20.

At stage 808, the TZ 15 may be configured to calculate a first authentication score based on the first authentication process. For example, the TZ 15 may combine the match score generated at stage 318 with the liveness score generated at stage 320 and determine the first authentication score. The TZ 15 may provide the first authentication score to the secure processor 20.

At stage 810, the secure processor 20 may be configured to perform a verification process on the one or more authentication parameters. The second authentication process executing in the secure processor 20 may represent a scaled down version of the first authentication processes. The second authentication process may utilize the authentication parameters computed in the TZ 15. The secure processor 20 may perform similar processes using the results received from the TZ 15 to verify those results. In an example of the verification process, if the secure processor 20 receives a keypoint location and description from the TZ 15, the secure processor 20 may be configured to analyze the image at that location and determine if a keypoint exists, and if so, determine if it matches the expected description. A failure to match (i.e., location and/or description) may indicate that the received authentication parameter is not valid. A similar verification process may be executed for the received feature vectors and template association information.

At stage 812, the secure processor 20 may be configured to determine if the authentication parameters are valid. If the authentication parameters are not valid, the secure processor 20 may be configured to output a warning message to indicate the authentication failed at stage 814. In an example, a failure to validate an authentication parameter may negatively impact (i.e., lower) the second authentication score. The validation decision at stage 812 may be incorporated in a second authentication process described at stage 816.

At stage 816, the secure processor 20 may be configured to perform a second authentication process on the biometric input on the secure processor 20, wherein the second authentication process utilizes the one or more authentication parameters. The secure processor 20 may be configured to execute scaled down authentication algorithms which may utilize the authentication parameters computed in the TZ 15 at stage 804. The second authentication process may calculate match and liveness scores. The second authentication process may include image pre-processing 352, keypoint detection and verification 354, feature description and verification 356, feature matching 358 and liveness detection 366. The image pre-processing algorithms may utilize the authentication parameters such as object mask information, gain values, and/or offset values. The keypoint detection and verification algorithms may utilize a pruned list of keypoints received from the TZ 15. The feature description and verification algorithms may access feature vectors computed on the TZ 15, and the feature matching algorithms may utilize the template association determined by the TZ 15. At stage 818, the secure processor 20 may be configured to calculate a second authentication score based on the second authentication process. In general, the second authentication score utilizes the match score generated at stage 358 and the liveness score generated at stage 366. The second authentication score, however, may be impacted by the verification failures. For example, if the feature description and verification results at stage 356 are inconsistent with the feature descriptors received from the TZ 15, the secure processor 20 may be configured to lower the second authentication score.

At stage 820, the secure processor 20 may be configured to calculate a fused authentication score based on the first authentication score and the second authentication score. The first authentication score includes a match score and liveness score. The TZ 15 may be configured to provide the results of the feature matching at stage 318, and the liveness detection at stage 320 to the secure processor. The secure processor 20 may be configured to fuse the received match and liveness scores with the match and liveness scores generated on the secure processor 20 (i.e., at stage 358 and stage 366, respectively). The fused authentication score may be output at stage 822.

Figure 9:
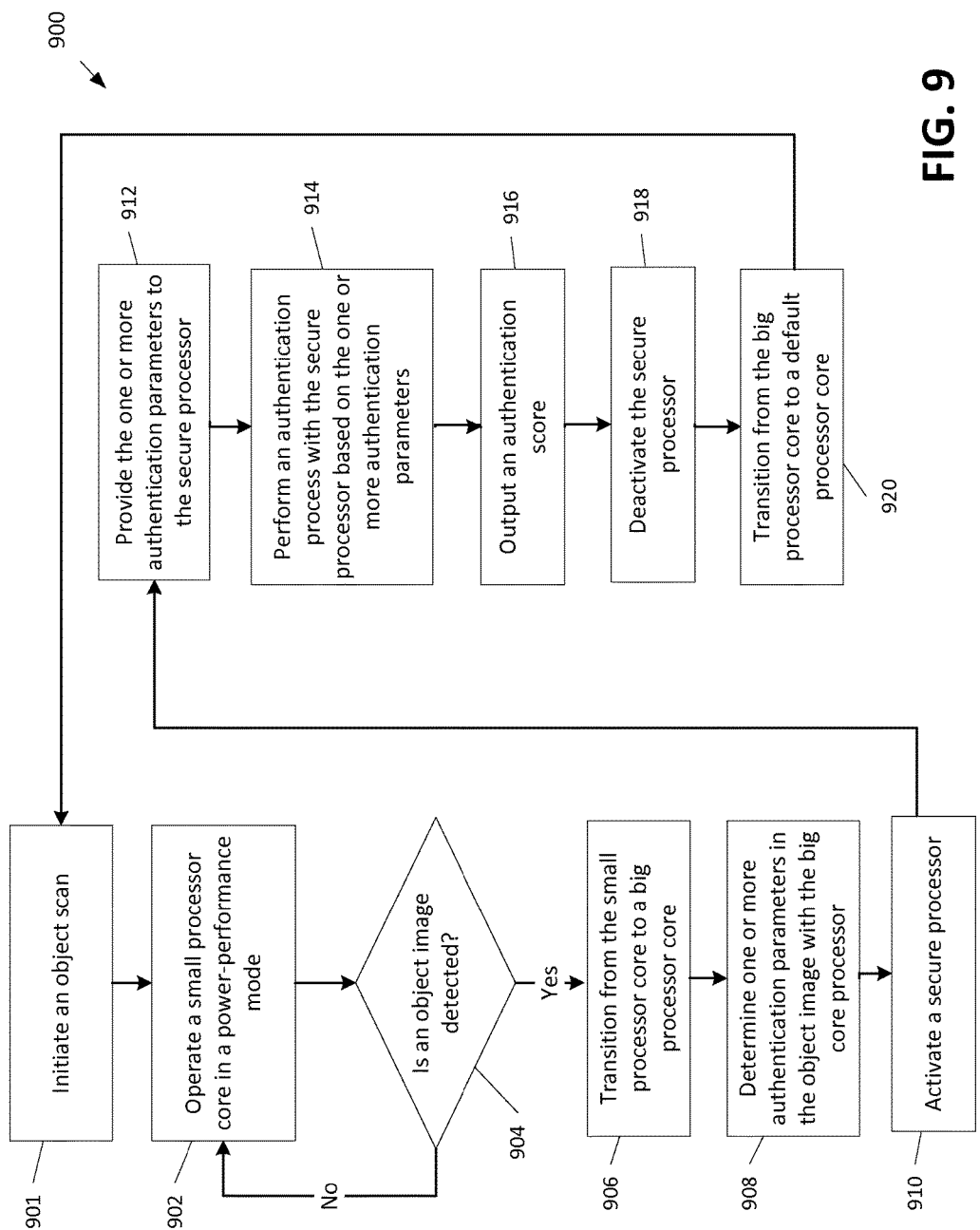
FIG. 9 is a flow diagram of a process for managing authentication latency and power in a distributed biometric authentication processor.

Referring to FIG. 9, with further reference to FIGS. 1-6, a process 900 for managing authentication latency and power in a distributed biometric authentication processor includes the stages shown. The process 900 is, however, an example only and not limiting. The process 900 can be altered, e.g., by having stages added, removed, rearranged, combined, performed concurrently and/or having stages split into multiple stages. In an embodiment, the biometric authentication system 100 may include processor executable instructions corresponding to the process 900 stored in the memory 16, and the APPS processor cluster 14 and the secure processor 20 may be configured to execute the instructions.

At stage 901, the biometric authentication system 100 may be configured to initiate an object scan. As an example, the biometric sensor 10 and the ASIC 12 may be configured to scan for a biometric input such as a fingerprint. The ASIC 12 may be configured to send an object detected signal to the TZ 15 (i.e., the APPS processor cluster 14).

At stage 902, the APPS processor cluster 14 may be configured to operate a small processor core in a power-performance mode. For example, the APPS processor cluster 14 may incorporate the ARM® big.LITTLE™ power optimization technology. The small processor core may be a high-efficiency Central Processing Unit (CPU) such as an ARM® Cortex-A53 and the power-performance mode may be controlled by algorithms such as Dynamic Voltage and Frequency Scaling (DVFS), clock gating, power gating, retention modes, and thermal management applications. The TZ 15 may be configured to perform object detection algorithms while in the small processor core power-performance mode to determine if an object is present at the image generated by the biometric sensor 10. At stage 904, the object detection process may loop until the TZ 15 determines that on object image is detected.

At stage 906, the TZ may be configured to transition from the small processor core to a big processor core. For example, in the ARM® big.LITTLE™ technology, a big processor core may be a Cortex-A57. Once the TZ 15 is operating with the big processor core, the TZ 15 is configured to determine one or more authentication parameters in the object image with the big core processor at stage 908. For example, the TZ 15 may be configured to execute the TZ stream 404 and calculate the one or more authentication parameters. In an example, the one or more authentication parameters may include image processing parameters such as gain, offset, dead pixel mask, and object masks. Other authentication parameters may include a pruned list of keypoint locations and the corresponding keypoint strength scores, match scores, feature vectors, template associations, and liveness scores.

At stage 910, the TZ 15 may be configured to active the secure processor 20. The APPS processor cluster 14 and the secure processor 20 may be integrated into a System on Chip (SoC) design. In an effort to manage power levels, the secure processor 20 may remain in a deactivated (or in another low power mode) until activated by the TZ 15. When required, the secure processor 20 may be activated to execute authentication algorithms, such as SP stream 406. The TZ 15 is configured to provide the authentication parameters to the secure processor 20 at stage 912.

At stage 914, the secure processor 20 may be configured to perform an authentication process based on the one or more authentication parameters. The secure processor 20 may be configured to execute scaled down authentication algorithms which may utilize the authentication parameters computed in the TZ 15 at stage 908. The authentication process may include image pre-processing stage 352, keypoint detection and verification stage 354, feature description and verification stage 356, feature matching stage 358, and liveness detection stage 366. The image pre-processing algorithms may utilize the authentication parameters such as object mask information, gain values, and/or offset values. The keypoint detection and verification algorithms may utilize a pruned list of keypoints received from the TZ 15. The feature description and verification algorithms may access feature vectors computed on the TZ 15, and the feature matching algorithms may utilize the template association determined by the TZ 15. The authentication process executing on the secure processor 20 may calculate an authentication score. For example, the authentication score may be based on the computed match score and a liveness score. At stage 916, the secure processor 20 may be configured to output the authentication score.

At stage 918, the TZ 15 may be configured to deactivate the secure processor 20 after the authentication score is determined. As used herein, the term deactivate means to reduce the power consumed by the secure processor 20, such as by turning it an OFF position, setting it to hibernate mode, or setting it to another low power mode. At stage 920, the TZ 15 is configured to transition the APPS processor cluster 14 from the big processor core to a default processor core. The default processor core may be based on concurrent system requirements. The ARM® big.LITTLE™ technology may include several frequency states for both big and little core processors. Global Task Scheduling (GTS) may schedule threads on the appropriate CPU core based on dynamic run-time behavior. The biometric authentication system 100 may remain in the default processor core mode until another object scan is initiated at stage 901.

Figure 10:
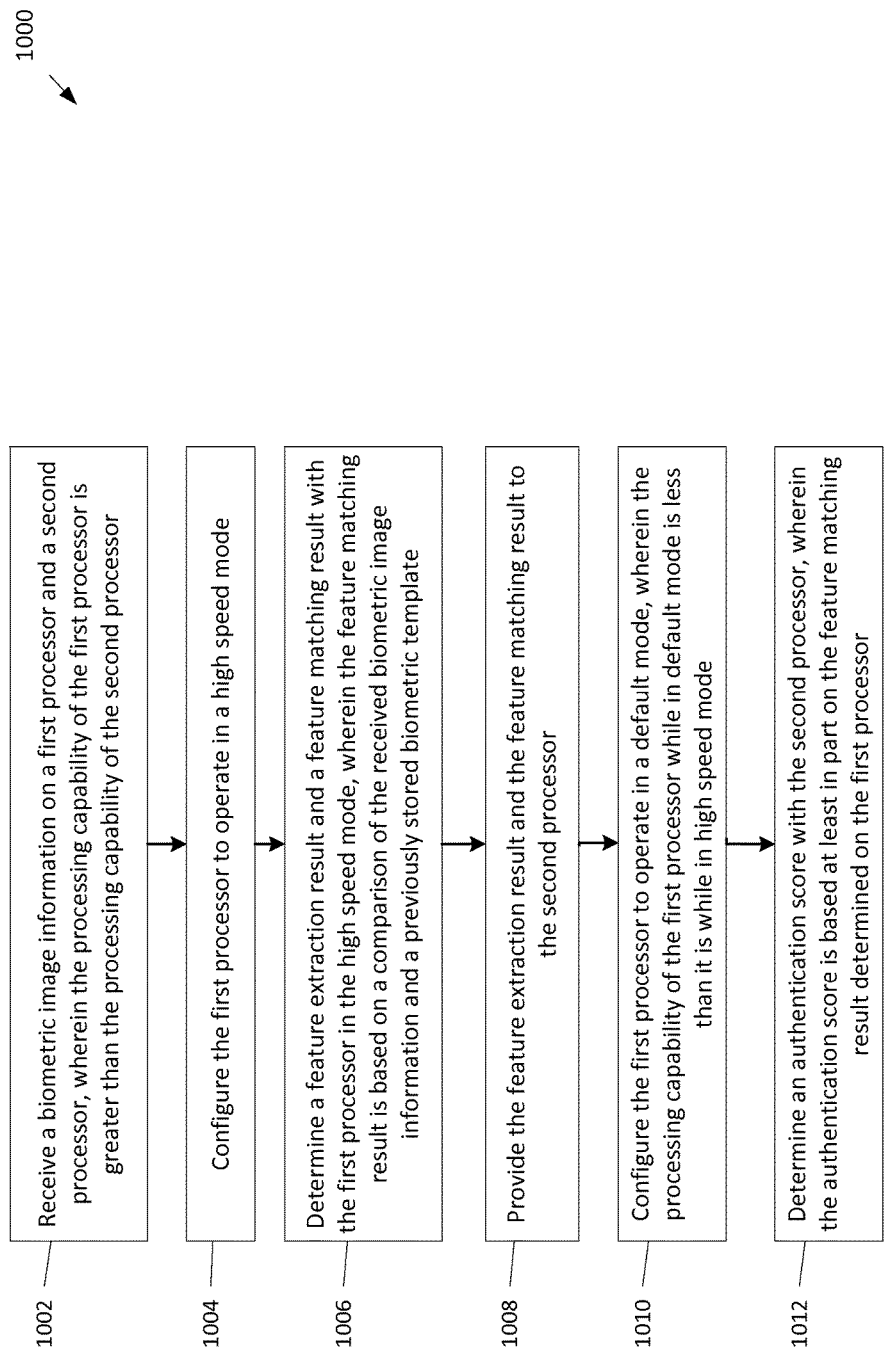
FIG. 10 is a flow diagram of a process for determining an authentication score with a heterogeneous distributed authentication system.

Referring to FIG. 10, with further reference to FIGS. 1-6, a process 1000 for determining an authentication score with a heterogeneous distributed authentication system includes the stages shown. The process 1000 is, however, an example only and not limiting. The process 1000 can be altered, e.g., by having stages added, removed, rearranged, combined, performed concurrently and/or having stages split into multiple stages. In an embodiment, the biometric authentication system 100 may include processor executable instructions corresponding to the process 1000 stored in the memory 16, and the APPS processor cluster 14 and the secure processor 20 may be configured to execute the instructions. The executable instructions stored in the memory, in combination with the capabilities of the APPS processor cluster 14, may include the means for configuring one or more processors to operate in high speed and/or default modes.

At stage 1002, the biometric authentication system 100 may be configured to receive biometric image information on a first processor and a second processor, wherein the processing capability of the first processor is greater than the processing capability of the second processor. The biometric image information may be generated by the biometric sensor 10 and the ASIC 12, and received by the TZ 15 operating within the APPS processor cluster 14 and the secure processor 20. The APPS processor cluster 14 utilizes the ARM® big.LITTLE™ power optimization technology, including Cortex-A53 and Cortex-A57 processors. The secure processor 20 may be an ARM® SC300 processor. In general, the processing capability of the secure processor 20 is approximately $\frac{1}{20}^{th}$ of the processing capability of the APPS processor cluster 14. This difference in processing capability is an example only, and not a limitation. An object of the process 1000 is to determine an authentication score while managing latency and power requirements. Thus, the relative difference between the first and second processor may be larger or smaller based on the latency and power performance requirements.

At stage 1004, the biometric authentication system 100 may configure the first processor to operate in a high speed mode. The ARM® big.LITTLE™ power optimization technology in the APPS processor cluster 14 includes multiple settings to manage power and performance. The high speed mode may consume more power, but the additional processing capabilities may reduce the latency associated with computational intensive keypoint detection and feature matching algorithms.

At stage 1006, the biometric authentication system 100 may be configured to determine a feature extraction result and a feature matching result with the first processor operating in high speed mode, wherein the feature matching result is based on a comparison of the received biometric image and a previously stored biometric template. The biometric authentication system 100 may execute the TZ stream 404 as means for determining the feature extraction and the feature matching result. The feature extraction result may include, for example, the pruned list of keypoints generated at stage 322. The feature matching results may include, for example, a match score and the template association information generated at stage 318. The template association information may relate to one or more feature templates which were previously stored in memory at stage 324.

At stage 1008, the biometric authentication system 100 may be configured to provide the feature extraction result and the feature matching result to the second processor. The second processor may be the secure processor 20. The TZ 15 is configured to provide signals to the secure processor 20. At least some of the signals contain the feature extraction result and the feature matching result. The signals may be encrypted.

At stage 1010, the biometric authentication system 100 may configure the first processor to operate in a default mode, wherein the processing capability of the first processor while in default mode is less than it is in high speed mode. Upon completion of the TZ stream 404, the TZ 15 may not need the additional processing capabilities of the big core. The TZ 15 may provide instructions to the APPS processor cluster 14 to reduce the processing capabilities and thus conserve power.

At stage 1012, the biometric authentication system 100 may be configured to determine an authentication score with the second processor, wherein the authentication score is based at least in part on the feature matching result determined on the first processor. The secure processor 20 may be configured to perform an authentication process on the biometric image information and calculate an authentication score. The secure processor 20 may be configured to execute scaled down authentication algorithms which may utilize the feature matching result the TZ 15 at stage 1006. In an example, the secure processor 20 may calculate a match score based on the template association information received from the TZ 15. The secure processor 20 may also determine a liveness score based on liveness information provided by the TZ 15. The authentication score may include both the match score and the liveness score.

Figure 11:
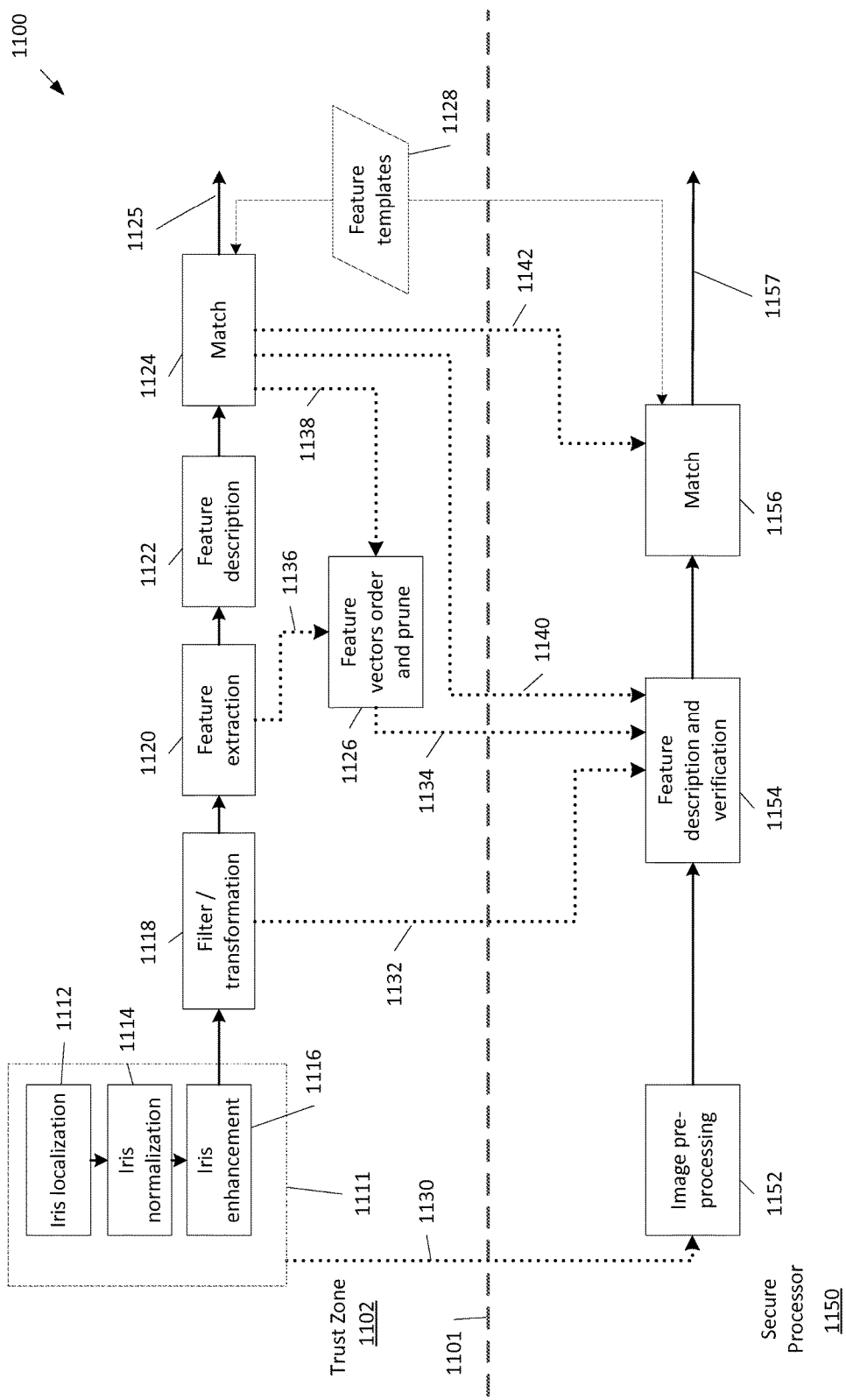
FIG. 11 is a functional block diagram of an exemplary distributed iris authentication system.

Referring to FIG. 11, with further reference to FIG. 1, a functional block diagram of an exemplary distributed iris authentication system 1100 includes the stages shown. The system 1100, however, is exemplary only and not limiting. The system 1100 may be altered, e.g., by having stages added, combined, removed, or rearranged. FIG. 11 is divided by a conceptual demarcation line 1101 into a Trust-Zone lane 1102 and a Secure Processor lane 1150. Each of the lanes illustrate the stages which are performed in the TrustZone 15 (TZ) (e.g., the APPS processor cluster 14) and the secure processor 20, respectively.

The TZ 15 is configured to receive image information from the biometric sensor 10 and the sensor ASIC 12. In an iris recognition configuration, the biometric sensor 10 is an Infrared (IR) camera, and may be configured to produce an image at approximately 500 dots per inch (dpi). Other sensors, such as a monochrome Charged Coupled Device (CCD), and resolutions may also be used. Biometric sensor 10 and the sensor ASIC 12 are configured to provide iris image information to an image pre-processing module 1111 operating within the TZ 15. The stages for image pre-processing may include an iris localization stage 1112, an iris normalization stage 1114, and an iris enhancement stage 1116. The iris localization stage 1112 is configured to locate the boundaries of the iris (i.e., outer and inner boundaries) and/or eyelids to identify the area of the image for subsequent processing (e.g., mask the areas that are not processed). The iris normalization stage 1114 may be configured to map the iris ring to a rectangular block of texture of a fixed size (e.g., a polar coordinates transformation). The iris enhancement stage 1116 may include image enhance algorithms to improve the quality of the image such as filtering and removing unwanted image components (e.g., eyelash image fragments). Other methods used for enhancing sharpness as well as illumination and noise reduction of normalized iris images may include traditional histogram equalization, contrast stretching, masking, deblurring, and focus correction. The iris image pre-processing parameters 1130, such as the iris location and mask information, normalization and enhancement parameters, are provided to the secure processor 20. The normalized and enhanced iris image is provided to the filter/transformation stage 1118.

At stage 1118, the TZ 15 may be configured to filter and/or transform the iris image information via circular or elliptical filtering. Other transformations, such as 2D Gabor and log Gabor filtering, may also be sued. The TZ 15 may map segments of the iris into vectors (i.e., phases) which identify locations within the iris image. The segments may be calculated by encoding the texture of the iris image into a phase sequence which may be invariant to the size of the iris in the image. The filtering/transformation parameters 1132 may be provided to the secure processor 20 for verification at stage 1154. At stage 1120 the TZ 15 may be configured to extract features from the iris image information. A collection of feature vectors 1136 may be provided for subsequent ordering and pruning at stage 1126. In an embodiment, a Scale Invariant Feature Transform (SIFT) algorithm may be used for feature extraction and to generate a feature vector. The SIFT algorithm may extract an image from a collection of keypoints. In general, these feature vectors are invariant to deformation (e.g., translation, rotation, scaling).

At stage 1122, the extracted feature vectors may be assigned a description value. The description may be based on the local orientation of the feature, variance, mean, gradient, or other image processing variable. The TZ 15 is configured to perform a matching algorithm with the iris image information and a stored database of feature templates. The feature vectors may represent Iris Codes and the matching is obtained by computing the distance (e.g, Hamming distance) between the input vectors. The matching result may optionally be output at a match score 1125. The match stage 1124 may also output the feature vector associated with a match point 1138 to the feature vectors order and prune stage 1126. Feature angle/region shift information 1140 and template association information 1142 determined by the TZ 15 may be provided to the secure processor 20. As described above, the match score 1125 may be dependent on a liveness module. Iris liveness detection may be based on focus features, refraction, iris motion features, occlusion features (e.g., eyelash fragments), temporal changes, or other enrollment parameters (e.g., iris size).

The secure processor 20 may be configured to receive the iris image information from the biosensor 10 (i.e., via the ASIC sensor 12) and the iris image pre-processing parameters 1130 from the TZ. At stage 1152, the secure processor 20 may verify some or all of the image pre-processing parameters (i.e., iris mask, normalization parameters), and provide a normalized and enhanced image to a feature description and verification stage 1154. The feature description and verification stage 1154 also receives the filtering/transformation parameters 1132 from the filter/transformation stage 1118. An ordered list of feature vectors 1134 may be received from the feature vectors order and prune stage 1126, and feature angle/region shift information 1140 may be received from the match process at stage 1124. One or more feature vectors (i.e., based on the ordered list) may be verified against the image information received from the image pre-processing stage 1152. The feature vectors may also be utilized for matching at stage 1156. The secure processor 20 determines a matching score at stage 1156 based on the distance between the received feature vectors and a template stored in the database of feature templates 1128. The specific template association information 1142 is used to select the corresponding template from the feature templates 1128. A match score 1157 may be calculated and output from the secure processor 20. As previously described, an iris liveness module (not shown in FIG. 11) may be used to modify the match score 1157.

As mentioned above, in one aspect, some embodiments may employ one or more data processing devices to perform biometric authentication methods in accordance with various embodiments of the invention. According to a set of embodiments, some or all of the procedures of such methods are performed by the biometric authentication system 100 in response to additional processors executing within a data processing device. One or more sequences of one or more instructions may be incorporated into the memory 16, or into a working memory in the data processing device (not shown), such that the execution of the sequences of instructions might cause the APPS processor cluster 14, the secure processor 20, or other processors to perform one or more procedures of the methods described herein.

The terms "machine-readable medium" and "computer-readable medium," as used herein, refer to any medium that participates in providing data that causes a machine to operate in a specific fashion. In an embodiment implemented using the biometric authentication system 100, various computer-readable media might be involved in providing instructions/code to the APPS processor cluster 14 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the memory 16. Transmission media include, without limitation, coaxial cables, copper wire and fiber optics, including the wires that comprise the bus 18, as well as the various components of the biometric authentication system 100. Transmission media can also take the form of waves (including without limitation radio, acoustic and/or light waves, such as those generated during radio-wave and infrared data communications).

Common forms of physical and/or tangible computer program product with a non-transitory computer-readable storage medium include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, EPROM, a FLASH-EPROM, DDR, eMMC, any other memory chip or cartridge, or any other medium from which a computer can read instructions and/or code.

Various forms of computer-readable media may be involved in carrying one or more sequences of one or more instructions to the APPS processor cluster 14 and the secure processor 20 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the biometric authentication system 100. These signals, which might be in the form of electromagnetic signals, acoustic signals, optical signals and/or the like, are all examples of carrier waves on which instructions can be encoded, in accordance with various embodiments of the invention.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method of authenticating a biometric input, comprising:
   receiving the biometric input from a biometric sensor;
   generating a biometric image based on the biometric input;
   performing a first authentication process on the biometric image with at least one application processor, wherein the first authentication process generates one or more authentication parameters;

providing the one or more authentication parameters to a secure processor;

performing a second authentication process on the biometric image on the secure processor, wherein the second authentication process utilizes the one or more authentication parameters; and outputting an authentication score based on the second authentication process.

2. The method of claim 1 wherein a processing capability of the at least one application processor is greater than a processing capability of the secure processor.

3. The method of claim 1 wherein the first authentication process includes a keypoint detection stage, a feature detection stage, and a feature matching stage, wherein one or more previously stored feature templates are utilized in the feature matching stage.

4. The method of claim 3 wherein the one or more authentication parameters include a pruned list of active areas.

5. The method of claim 3 wherein the one or more authentication parameters include a template association information.

6. The method of claim 3 wherein the first authentication process includes calculating a match score and the one or more authentication parameters include a matched pair and a match angle.

7. The method of claim 1 wherein the first authentication process includes calculating a liveness score.

8. The method of claim 1 wherein the biometric input is a fingerprint.

9. A system for authenticating a biometric image, comprising:

a biometric sensor;

at least one application processor configured to receive the biometric image from the biometric sensor and perform a first authentication process on the biometric image, wherein the first authentication process generates one or more authentication parameters;

a secure processor configured to:
receive the biometric image from the biometric sensor;
receive the one or more authentication parameters;
perform a second authentication process on the biometric image, wherein the second authentication process utilizes the one or more authentication parameters; and
output an authentication score based on the second authentication process.

10. The system of claim 9 wherein a processing capability of the at least one application processor is greater than a processing capability of the secure processor.

11. The system of claim 9 wherein the at least one application processor is configured to perform a keypoint detection stage, a feature detection stage, and a feature matching stage, wherein one or more previously stored feature templates are utilized in the feature matching stage.

12. The system of claim 11 wherein the one or more authentication parameters include a pruned list of active areas.

13. The system of claim 11 wherein the one or more authentication parameters include a template association information.

14. The system of claim 11 wherein the at least one application processor is configured to calculate a match score and the one or more authentication parameters include a matched pair and a match angle.

15. The system of claim 9 wherein the at least one application processor is configured to calculate a liveness score.

16. The system of claim 9 wherein the biometric image is an iris image.

* * * * *